(12) United States Patent
Donohue et al.

(10) Patent No.: US 12,427,462 B2
(45) Date of Patent: Sep. 30, 2025

(54) AIR CLEANING BLOWER SYSTEMS, METHODS, AND ADAPTATIONS

(71) Applicant: Andover Protection Systems, LLC, Stephentown, NY (US)

(72) Inventors: Austin Donohue, Selkirk, NY (US); Jonathan Bernard Wetjen, Kew Gardens, NY (US); Edward Roston, Stephentown, NY (US)

(73) Assignee: Andover Protection Systems, LLC, Stephentown, NY (US)

( * ) Notice: Subject to any disclaimer, the term of this patent is extended or adjusted under 35 U.S.C. 154(b) by 336 days.

(21) Appl. No.: 18/048,112

(22) Filed: Oct. 20, 2022

(65) Prior Publication Data

US 2023/0256370 A1    Aug. 17, 2023

Related U.S. Application Data

(60) Provisional application No. 63/309,914, filed on Feb. 14, 2022.

(51) Int. Cl.
| | |
|---|---|
| *B01D 45/14* | (2006.01) |
| *F04D 29/42* | (2006.01) |
| *F04D 29/70* | (2006.01) |

(52) U.S. Cl.
CPC ......... *B01D 45/14* (2013.01); *F04D 29/4226* (2013.01); *F04D 29/703* (2013.01)

(58) Field of Classification Search
CPC ..... B01D 45/14; B01D 45/08; F04D 29/4226; F04D 29/703; F04D 23/003; F04D 29/4246; F04D 29/4233; F04D 29/4253
See application file for complete search history.

(56) References Cited

U.S. PATENT DOCUMENTS

| | | |
|---|---|---|
| 1,785,918 A | 12/1930 | Stebbins |
| 2,209,607 A | 7/1940 | Nutting |

(Continued)

FOREIGN PATENT DOCUMENTS

| | | |
|---|---|---|
| DE | 102008012402 | 9/2009 |
| JP | 2018140343 A * | 9/2018 |

(Continued)

OTHER PUBLICATIONS

JP 2018 140343—English Translation (Year: 2018).*

(Continued)

*Primary Examiner* — Aaron R Eastman
(74) *Attorney, Agent, or Firm* — Ansari Katiraei LLP; Arman Katiraei; Sadiq Ansari

(57) ABSTRACT

Disclosed is an air-cleaning blower ("ACB") that includes an inlet cover, housing, clean-side cover, and impeller. The inlet cover may be a rigid flat surface with a central opening. The housing may have a hollow inner cavity and walls that form an incomplete cylinder with a slit between the walls. The clean-side cover may be a rigid flat surface with apertures, and with brackets extending between the apertures to connect an impeller/motor mount to the clean-side cover. The impeller may be mounted on the impeller/motor mount inside the housing between the inlet cover and the clean-side cover. The impeller rotates to induce suction of particulate-pervaded air or gas through the central opening, to circulate the heavier particulates against an interior of the walls until ejection through the slit, and to circulate the lighter cleaned air or gas in front of the heavier particulates until ejection through the apertures.

19 Claims, 38 Drawing Sheets

(56) References Cited

U.S. PATENT DOCUMENTS

| | | | |
|---|---|---|---|
| 2,327,886 | A | 8/1943 | Haber |
| 2,593,294 | A | 4/1952 | Goldberg |
| 2,780,309 | A | 2/1957 | Tor |
| 4,279,743 | A | 7/1981 | Miller |
| 6,110,246 | A * | 8/2000 | Eubank .................. B01D 45/14 55/394 |
| 7,249,468 | B2 | 7/2007 | Roston |
| 7,749,310 | B2 | 7/2010 | Lagerstedt et al. |
| 8,353,665 | B1 * | 1/2013 | Stockstill .............. F04D 29/289 415/206 |
| 10,493,390 | B2 | 12/2019 | Roston et al. |
| 2003/0085158 | A1 | 5/2003 | Oirschot |
| 2003/0115845 | A1 * | 6/2003 | Petersen, Jr. .......... B01D 45/14 55/406 |
| 2003/0221996 | A1 | 12/2003 | Svoronos et al. |
| 2007/0237656 | A1 * | 10/2007 | Pipkorn ................ F04D 29/542 417/366 |
| 2008/0308480 | A1 | 12/2008 | Lagerstedt et al. |
| 2012/0010063 | A1 | 1/2012 | Levitt et al. |
| 2017/0298959 | A1 * | 10/2017 | Boudreaux ........... F04D 29/282 |
| 2021/0156400 | A1 * | 5/2021 | Petersen, Jr. ......... F04D 29/664 |
| 2021/0203210 | A1 * | 7/2021 | Smith ..................... F04D 17/08 |

FOREIGN PATENT DOCUMENTS

| | | |
|---|---|---|
| WO | WO9740915 | 11/1997 |
| WO | WO2001010536 A1 | 2/2001 |

OTHER PUBLICATIONS

International Search Report and Written Opinion for PCT/US2014/064660, Feb. 23, 2015, 13 pages.

Extended European Search Report for European Application 14861087.6 andPCT/US2014/064660, May 29, 2017, 10 pages.

* cited by examiner

AIR CLEANING BLOWER SYSTEMS, METHODS, AND ADAPTATIONS

CLAIM OF BENEFIT TO RELATED APPLICATIONS

This application claims the benefit of U.S. provisional patent application 63/309,914 entitled "Air Cleaning Blower Systems, Methods, and Adaptations" filed on Feb. 14, 2022. The contents of application 63/309,914 are hereby incorporated by reference.

BACKGROUND

In many industrial, commercial, institutional, and residential applications, machinery and facilities are subjected to environmental hazards and harsh operating conditions that expedite or otherwise induce mechanical failure or sub-optimal operation of the equipment, overheating, and many other unwanted effects. The same environmental hazards and harsh operating conditions may also impact human and animal health and comfort.

Air or gas that is pervaded with particulates is one such hazard. The particulates can include coal dust, saw dust, metal dust, road dust, dirt, sand, pollen, bugs and liquid contaminants as some examples. When the air and the accompanying particulates enter into the equipment, the particulates can disrupt or interfere with the normal operation of equipment, and thus cause its failure or sub-optimal operation. Similarly, when the particulates enter closed or controlled environments or systems, such as hospitals, electrical cabinets, homes, communications equipment, work spaces, vehicles, and other facilities, the particulates can create failure or safety issues. The particulates may also be harmful to humans and animals breathing in the particulate-pervaded air whether in a closed or open environment.

Filtration systems may be used to capture the particulates. However, filtration systems can be expensive due to their need for regular maintenance and expensive filter media that require frequent replacement in order to operate efficiently and effectively, and media which can collect and concentrate hazardous materials. Additionally, in many cases, there is no need to collect the contaminants, only the need to remove them from the air or other gas before it is directed to its application such as ventilating, pressurizing or purging an enclosure, or protecting people from pathogens or other hazards.

DETAILED DESCRIPTION OF PREFERRED EMBODIMENTS

The following detailed description refers to the accompanying drawings. The same reference numbers in different drawings may identify the same or similar elements.

Disclosed are systems, methods, and adaptations of an air-cleaning blower ("ACB") for separating and ejecting particulates (e.g., debris) from air or gas in different environments, settings, and applications. For instance, the ACB may receive particulate-pervaded air or gas, may separate and eject coal dust, saw dust, metal dust, road dust, dirt, sand, pollen, contaminants, irritants, rain, bugs and/or other harmful particulates from particulate-pervaded air or gas out a first outlet of the ACB, and may eject the cleaned air or gas, that results from separating the particulates from the particulate-pervaded air or gas, out a second outlet of the ACB.

In some embodiments, the ACB may eject the particulates away from a target object or person, and may direct the cleaned air or gas towards the target object or person. Accordingly, the ACB may be used to improve ventilation and/or may be used in applications that require pressurization or directed air flow. In some embodiments, the ACB may provide a directed cone or envelope of clean air over or around a worker, workspace, or other protected target within an environment replete with particulate-pervaded air or gas. In some embodiments, the ACB may provide the clean air or gas directly into an air or gas inlet of machinery. The ACB may be manufactured in different shapes and sizes and may be mounted onto, incorporated into or in other ways combined with enclosures, ductwork and other devices for these and other applications.

The ACB may function independently of any filtration media. Instead, the ACB may separate the particulates from the particulate-pervaded air or gas by generating centrifugal or centripetal forces within a housing to create different zones of pressure within the housing that induce the separation of the heavier particulates from the lighter air or gas based on the greater mass and/or momentum of the heavier particulates relative to the lighter air or gas.

Figure 1:
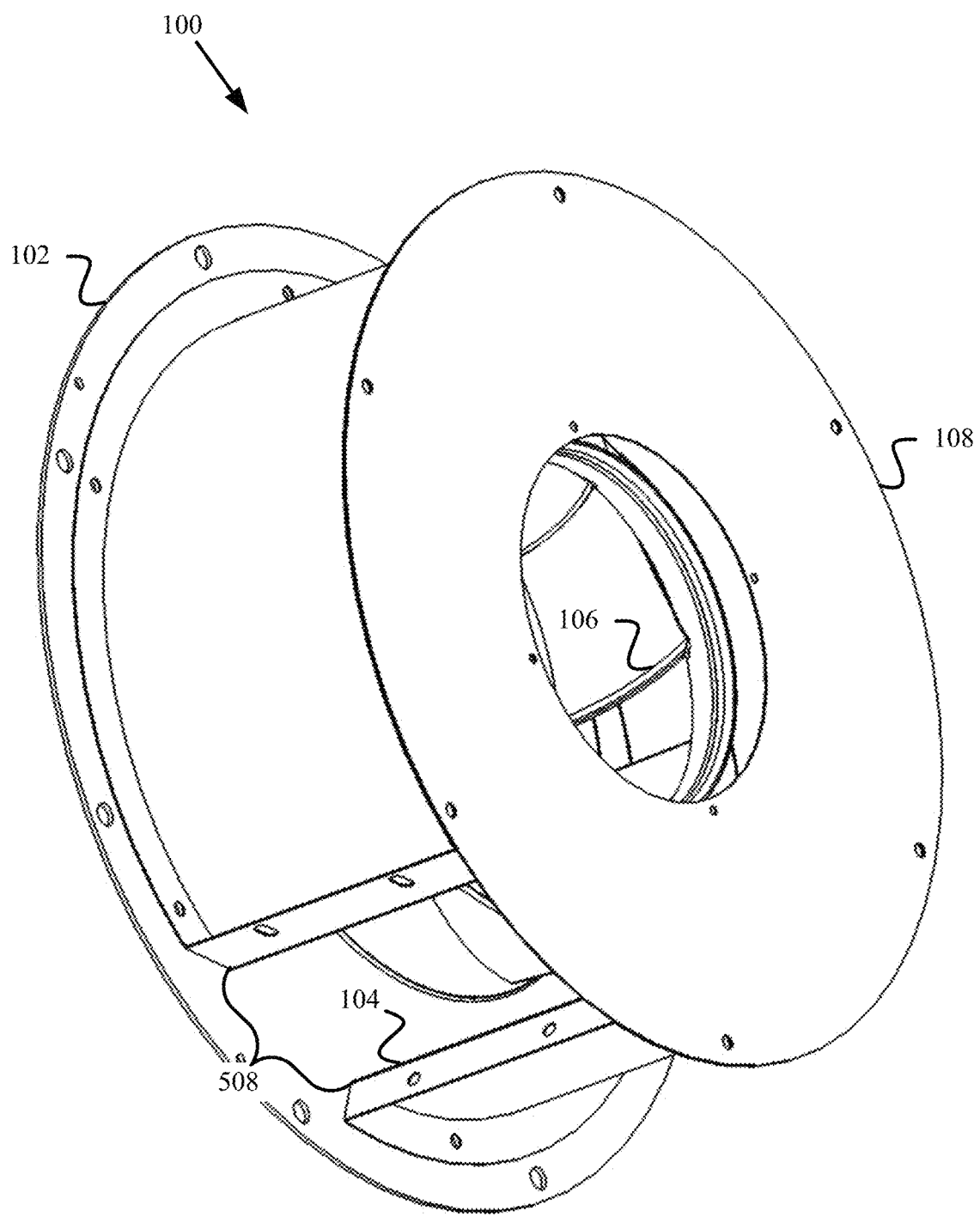
FIG. 1 illustrates a perspective side view of an air-cleaning blower ("ACB") in accordance with some embodiments presented herein.
Figure 2:
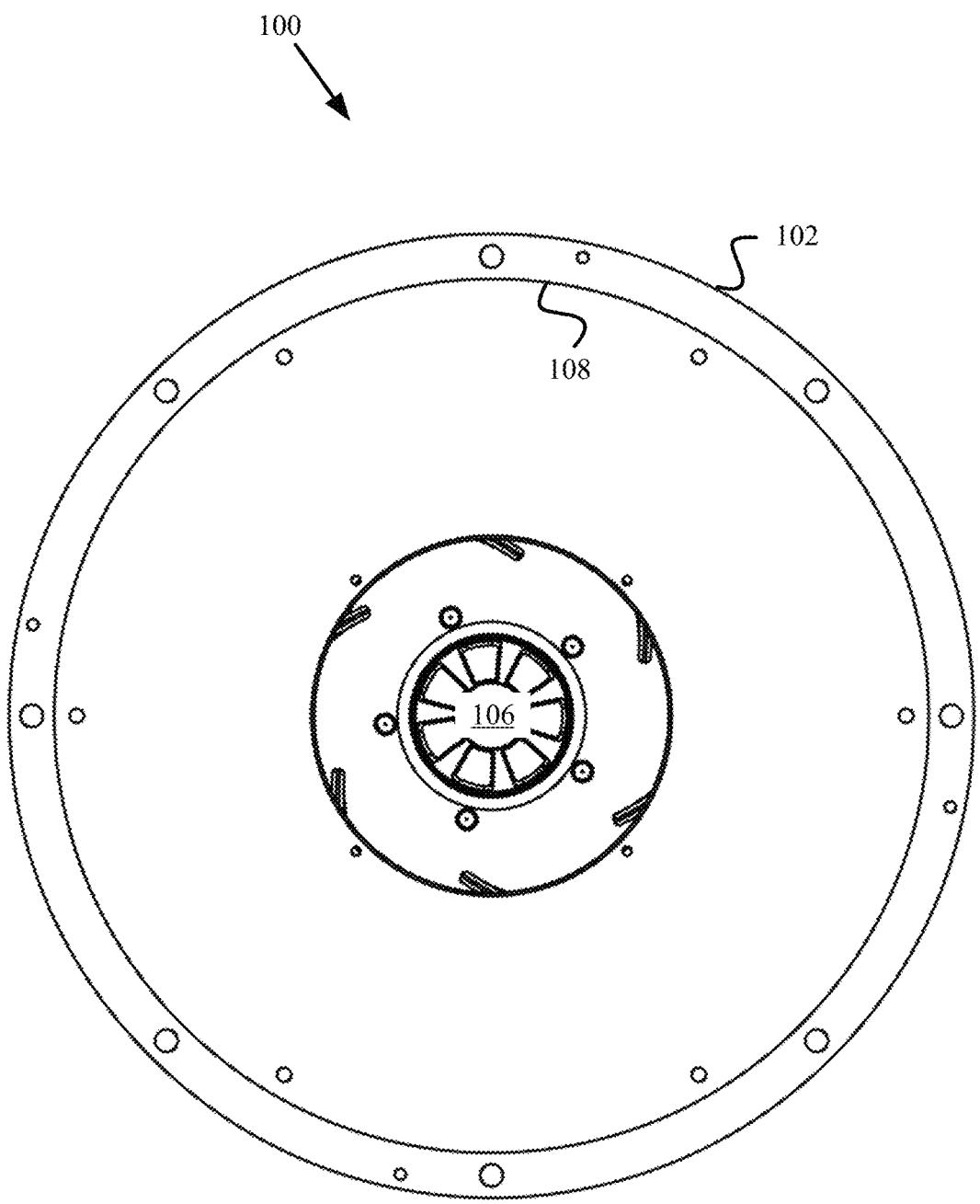
FIG. 2 illustrates a top view of the ACB in accordance with some embodiments presented herein.
Figure 3:
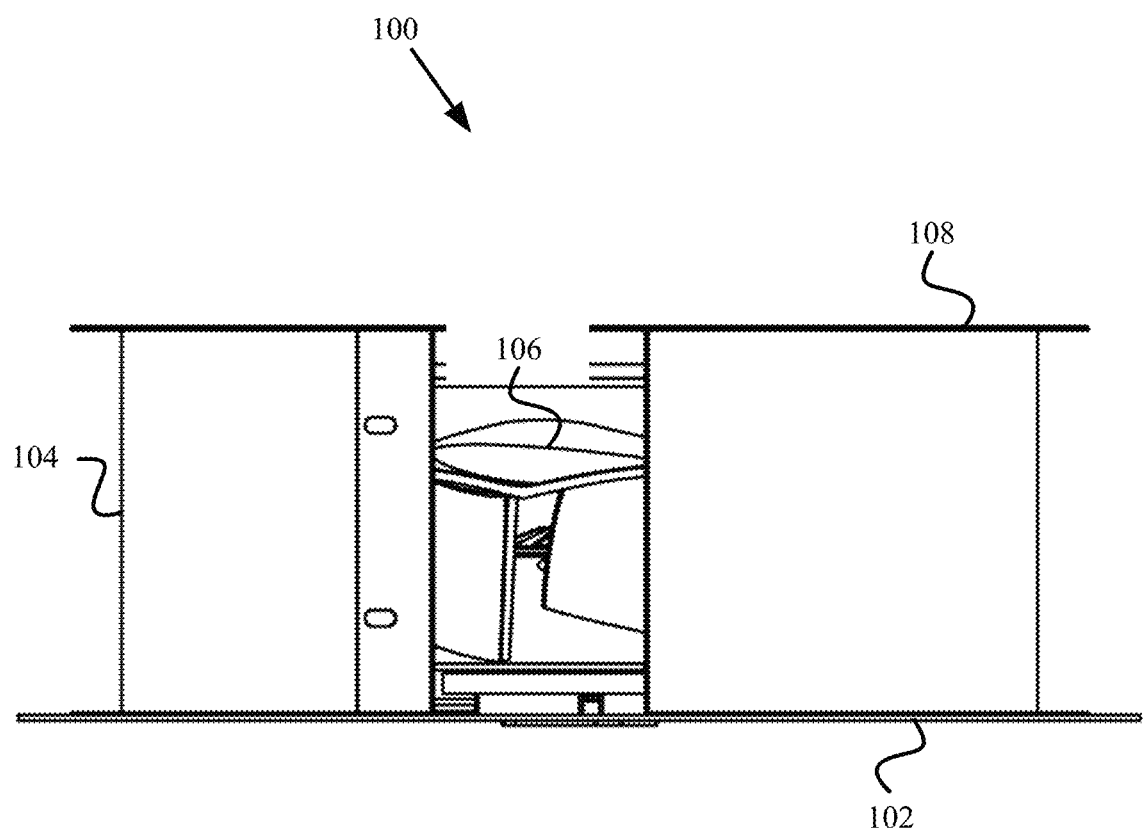
FIG. 3 illustrates a side view of the ACB in accordance with some embodiments presented herein.
Figure 4:
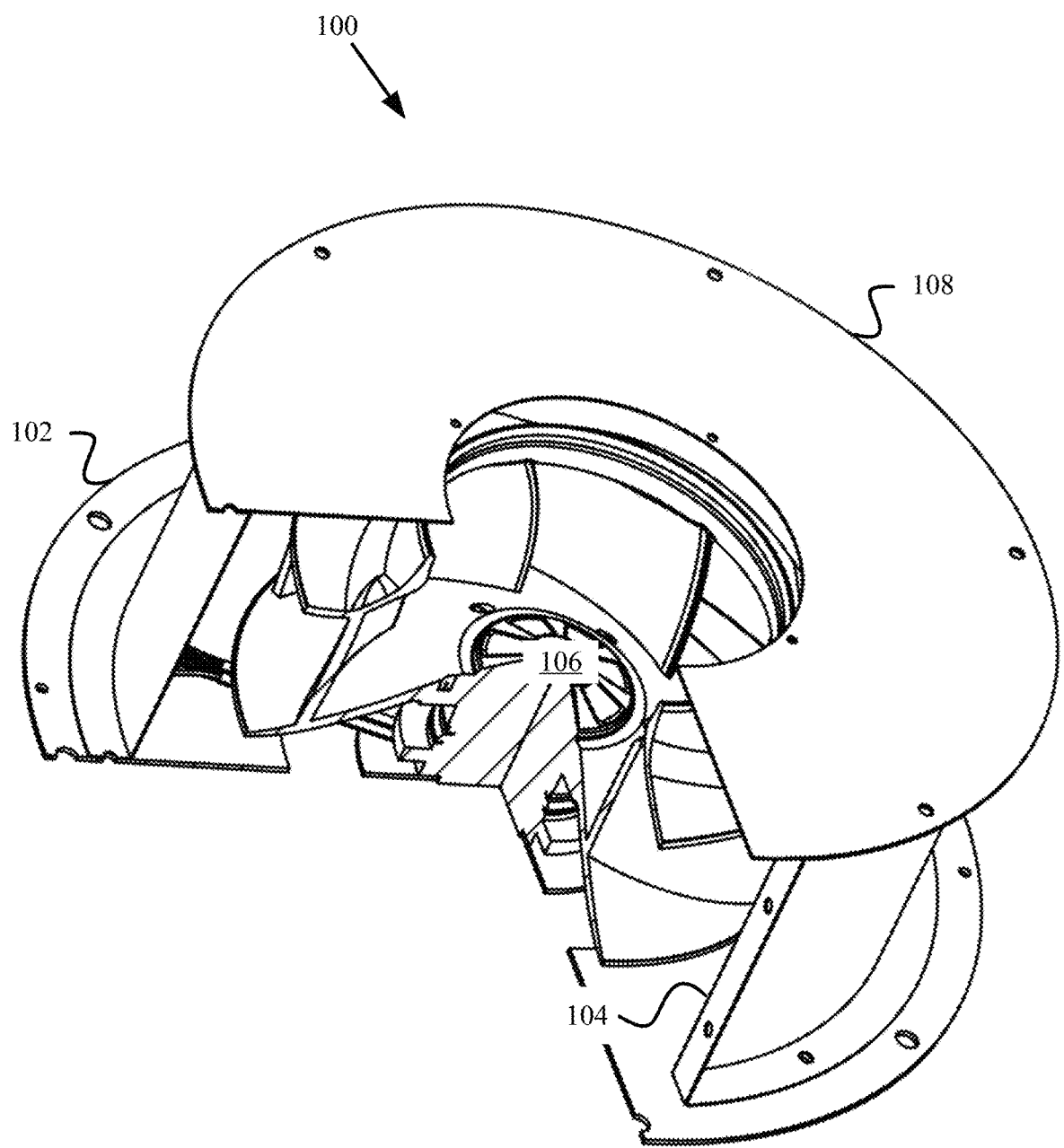
FIG. 4 illustrates a partial cutaway view of the ACB in accordance with some embodiments presented herein.
Figure 5:
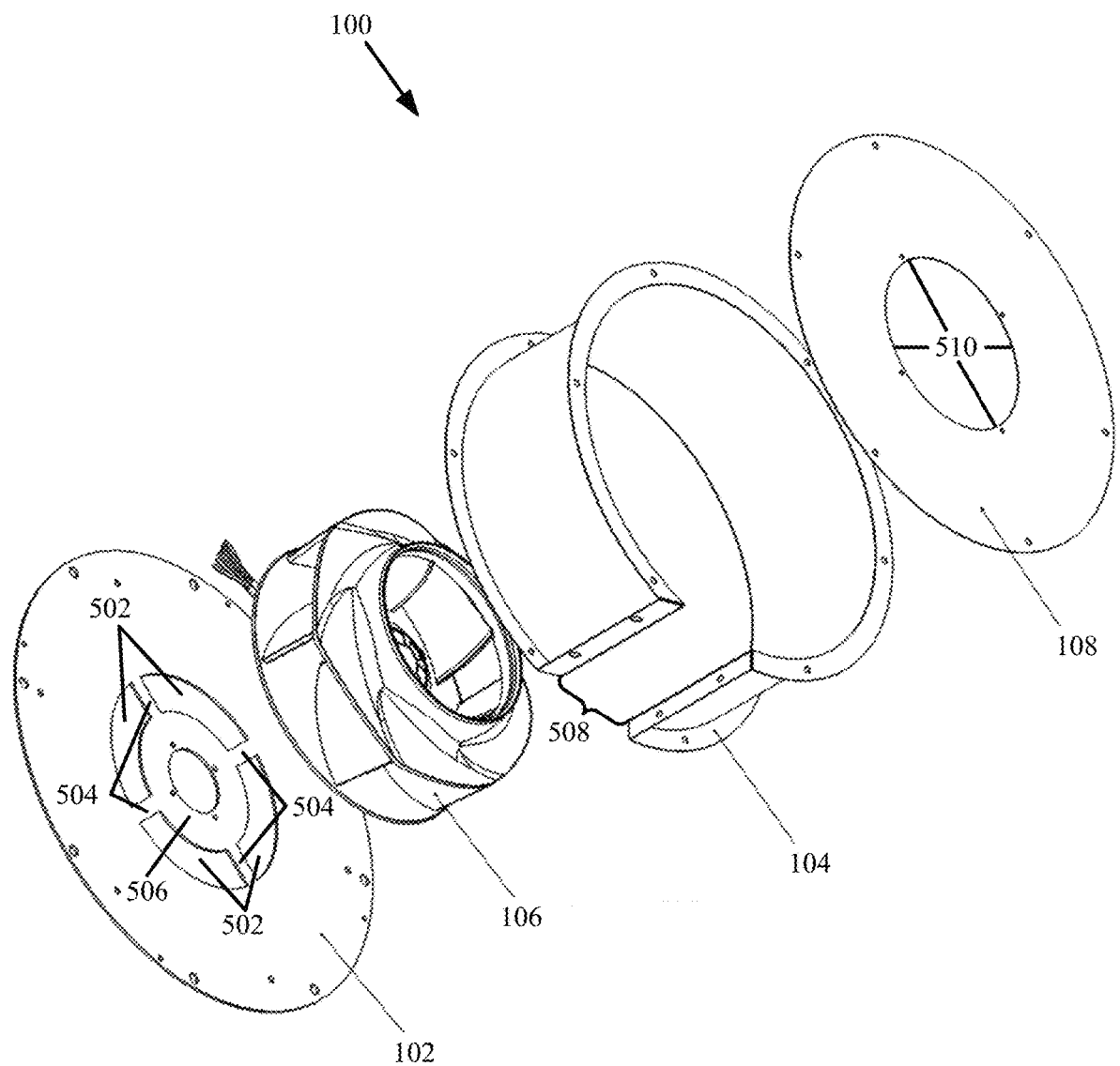
FIG. 5 illustrates an exploded view of the ACB in accordance with some embodiments presented herein.

FIG. 1 illustrates a perspective side view of ACB 100 in accordance with some embodiments presented herein. FIG. 2 illustrates a top view of ACB 100 in accordance with some embodiments presented herein. FIG. 3 illustrates a side view of ACB 100 in accordance with some embodiments presented herein. FIG. 4 illustrates a partial cutaway view of ACB 100 in accordance with some embodiments presented herein. FIG. 5 illustrates an exploded view of ACB 100 in accordance with some embodiments presented herein. As shown in FIGS. 1-5, ACB 100 may include clean-side cover 102, housing 104, impeller 106, and inlet cover 108.

Figure 6:
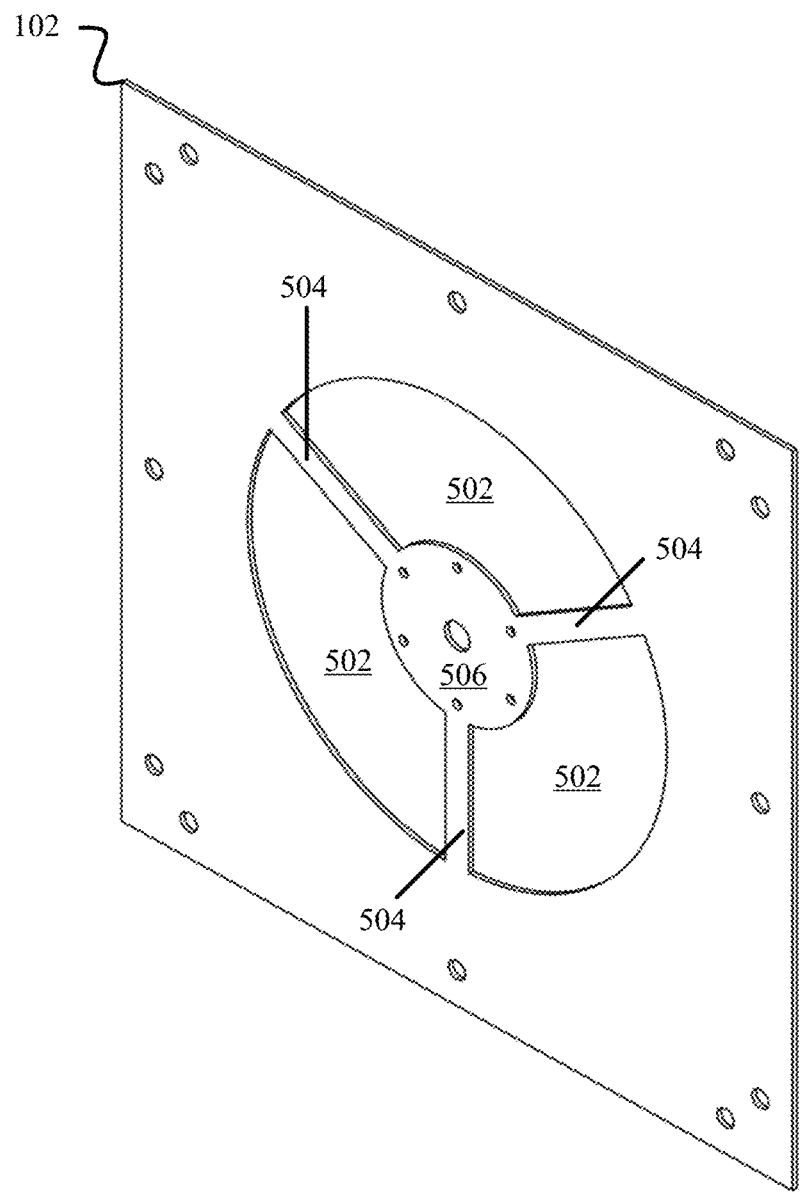
FIG. 6 illustrates a clean-side cover with a rectangular or square form in accordance with some embodiments presented herein.

Clean-side cover 102 may include a metal or rigid wall or flat surface onto which housing 104, impeller 106, and/or a motor to power impeller 106 may be mounted or through which the shaft of the motor powering impeller 106 passes. Depending on the application of ACB 100, clean-side cover 102 may be of different sizes and/or shapes, or may not be present for some embodiments of ACB 100. For instance, FIG. 5 illustrates clean-side cover 102 with a round or circular form that may be connected or mounted to a circular exhaust, vent, or tube, and FIG. 6 illustrates clean-side cover 102 with a rectangular or square form that may be connected or mounted to a rectangular or other-shaped exhaust, vent, or duct. In some embodiments, different clean-side covers 102 may be used to attach ACB 100 to different machines, devices, intakes, inlets, etc., and/or for attaching ACB 100 in different orientations or to different locations.

Clean-side cover 102 may include apertures 502, brackets 504, and impeller mount 506 (or motor mount). In some embodiments, clean-side cover 102 may be a single continuous material (e.g., sheet metal, aluminum, plastic, etc.) that is cut, molded, and/or otherwise formed with apertures 502, brackets 504, and impeller mount 506.

Apertures 502 provide the cleaned air or gas outlet of ACB 100. Apertures 502 may include gaps or openings about clean-side cover 102 from which the cleaned air or gas may exit ACB 100. Apertures 502 may include semi-circular or quarter-circular gaps that are separated by brackets 504 and that surround impeller mount 506. In some embodiments, apertures 502 may include a full/complete circle as illustrated by reference marker 2504 of FIG. 25. In some embodiments, apertures 502 may direct the cleaned air or gas into machinery, ducts, pipes, rooms, and/or other enclosures that may be connected to a rear face of clean-side cover 102 or onto which clean-side cover 102 is mounted. In any case, ACB 100 directs the cleaned air or gas through apertures 502 regardless of how ACB 100 is mounted or if any objects are connected to the backside (downstream side) of clean-side cover 102. In some embodiments, apertures 502 may be fitted with a mesh or grate for safety purposes and/or to prevent objects from entering and damaging ACB 100 from the rear.

Apertures 502 may be aligned with a circumference of impeller 106, and may be located behind impeller 106. In some embodiments, the diameter, width, and/or size of apertures 502 may be smaller than the diameter of impeller 106 in order to increase the positive pressure for separating the particulates from the air or gas, and/or for ejecting the separated particulates and cleaned air or gas from different outlets of ACB 100. In some embodiments, apertures 502 may be larger than impeller 106 to attain other objectives such as increased airflow. In some embodiments, the size/shape of apertures 502 may be modified according to the environment or application in which ACB 100 is to be used, the amount of pressure to be created inside ACB 100, and/or to direct and/or damper the discharged clean air or gas.

Brackets 504 may separate apertures 502 from one another, and may be used to position impeller mount 506 centrally about clean-side cover 102. Brackets 504 may include rigid extensions that span across apertures 502 in order to connect impeller mount 506 to clean-side cover 102.

Figure 30:
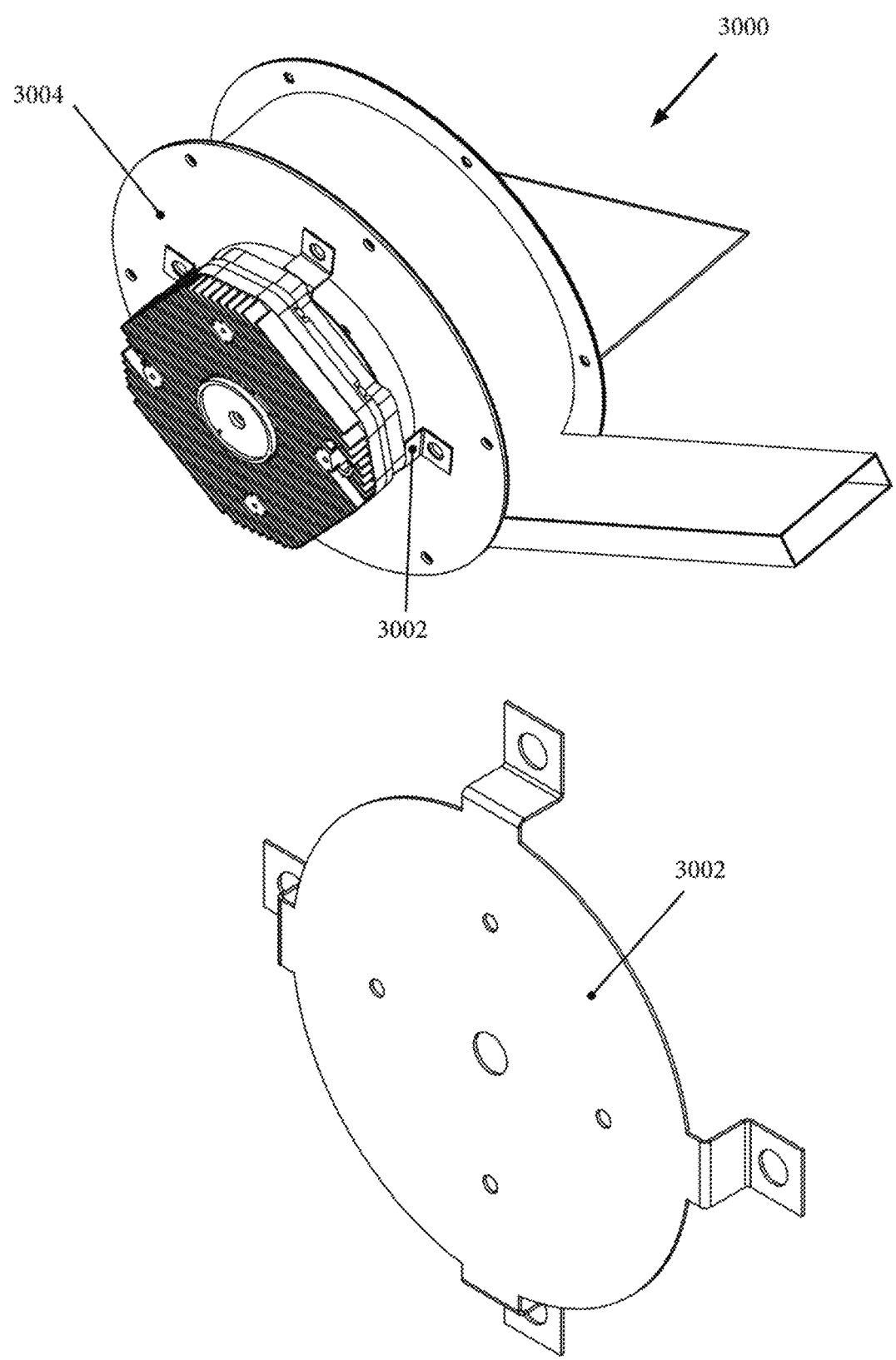
FIG. 30 illustrates modified structures for mounting an impeller/motor to increase airflow/CFM of clean gas/air in accordance with some embodiments presented herein.

Impeller mount 506 may be a rigid base or plate onto which impeller 106 may be mounted or attached, a motor supporting impeller 106 may be mounted or attached, and/or a support (such as a pillow block) for a shaft onto which impeller 106 may be mounted and driven by remotely-located motor or other source of power. Impeller mount 506 may be of the same thickness and height as other sections of clean-side cover 102, and may include a set of holes that may be used to secure impeller 106 and/or a rotating shaft onto which impeller 106 may be mounted. In some embodiments, the shaft may be supported, guided, or simply pass through, impeller mount 506. In some configurations, impeller mount 506 may be altered to increase the airflow/CFM of the clean gas/air coming out of the clean side cover 102 as seen in FIG. 30

Housing 104 may include a cylindrical structure with hollow inner cavity. The cylindrical structure may include walls that extend to a particular height and that include a gap or slit that forms particulate outlet 508 of ACB 100. Housing 104 may be formed from the same material as clean-side cover 102. For instance, housing 104 may include a section of sheet metal, aluminum, plastic, or another rigid material. In some embodiments, housing 104 may include a section of flexible material held in place by supports.

Housing 104 spans the space between clean-side cover 102 and inlet cover 108 and surrounds impeller 106 inside ACB 100. The wall height for housing 104 may be dependent on the height of impeller 106.

Housing 104 may be attached to clean-side cover 102 and inlet cover 108 on either side using screws, nuts and bolts, welding, adhesive, and/or other fasteners. Specifically, housing 104 may include lips or flanges that extend out from either end of the cylindrical structure, and each lip or flange may include one or more holes that align with holes about clean-side cover 102 and inlet cover 108. Screws, nuts and bolts, and/or other fasteners may be inserted into the aligned holes to secure the structures together. In some embodiments, clean-side cover 102 and inlet cover 108 may be attached to housing 104 to form an air-tight seal and/or to prevent air or particulates from escaping where the structure of clean-side cover 102 meets the structure of clean-side cover 102 and the structure of inlet cover 108.

In some embodiments, two or more of clean-side cover 102, housing 104, and inlet cover 108 may be formed as a single structure. For instance, clean-side cover 102 and housing 104 may be formed from a single piece of sheet metal, various plastics, or other materials, and inlet cover 108 may be attached to that single piece once impeller 106 is attached to impeller mount 506.

Figure 7:
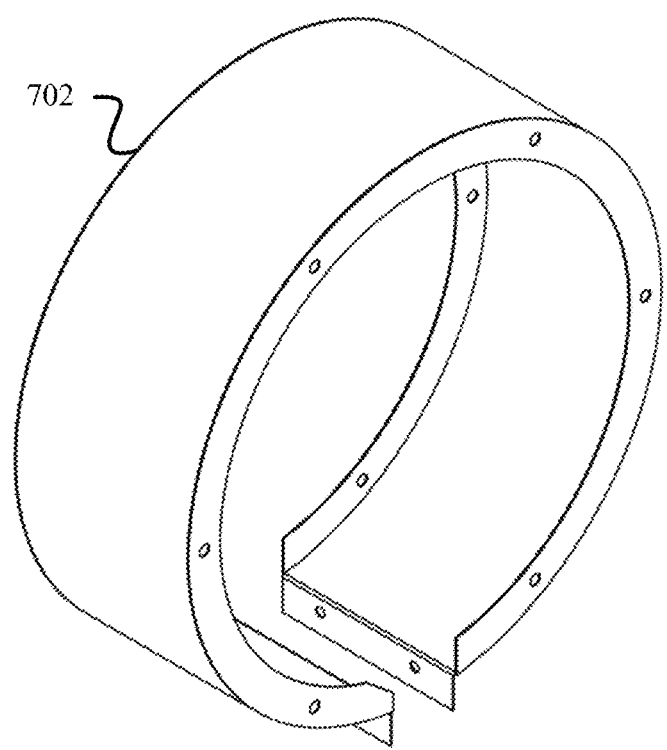
FIG. 7 illustrates examples of the ACB housing with a smooth exterior and the housing with a stepped exterior in accordance with some embodiments presented herein.
Figure 7:
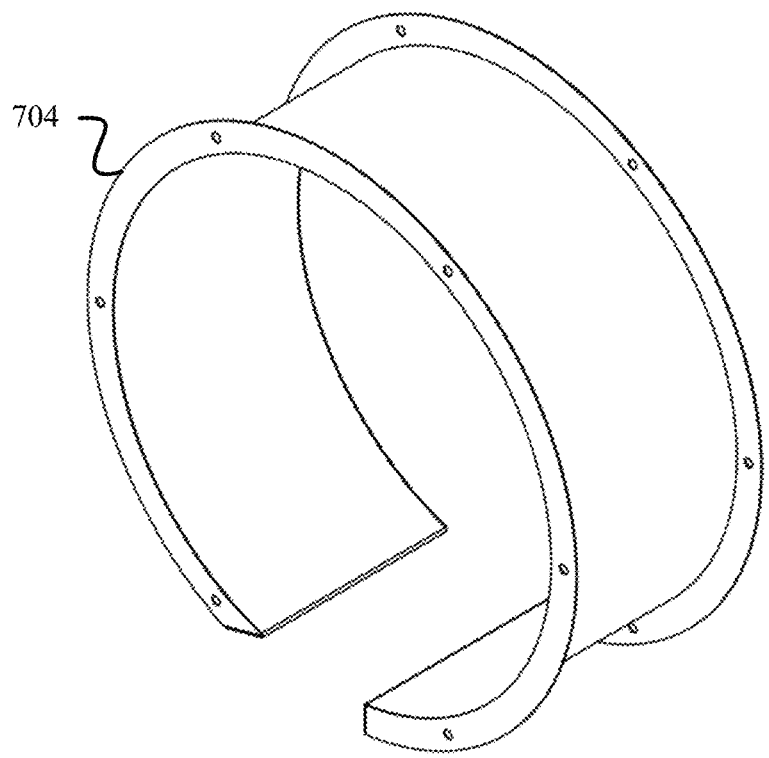

In some embodiments, housing 104 may have a uniform diameter to produce a cylindrical shape. In some embodiments, housing 104 may have a non-uniform diameter to produce a conical shape that is wider towards inlet cover 108 and narrower towards clean-side cover 102, a conical shape that is wider towards clean-side cover 102 and narrower towards inlet cover 108, or another shape (e.g., a shape that may be variable in relative width). Housing 104 may also have a smooth or stepped exterior. FIG. 7 illustrates examples of housing with a smooth exterior 702 and housing with a stepped exterior 704.

Inlet cover 108 may include a metal or rigid wall or flat surface with central opening 510 that lets the particulate-pervaded air or gas enter into ACB 100. When inlet cover 108 is mounted to housing 104, central opening 510 may be aligned with impeller 106.

As shown in FIG. 5, inlet cover 108 may have a circular or disc shape for a first set of applications. For instance, inlet cover 108 may be connected to a vent, exhaust, or tube in order to receive the particulate-pervaded air or gas flowing through that vent, exhaust, or tube.

Figure 8:
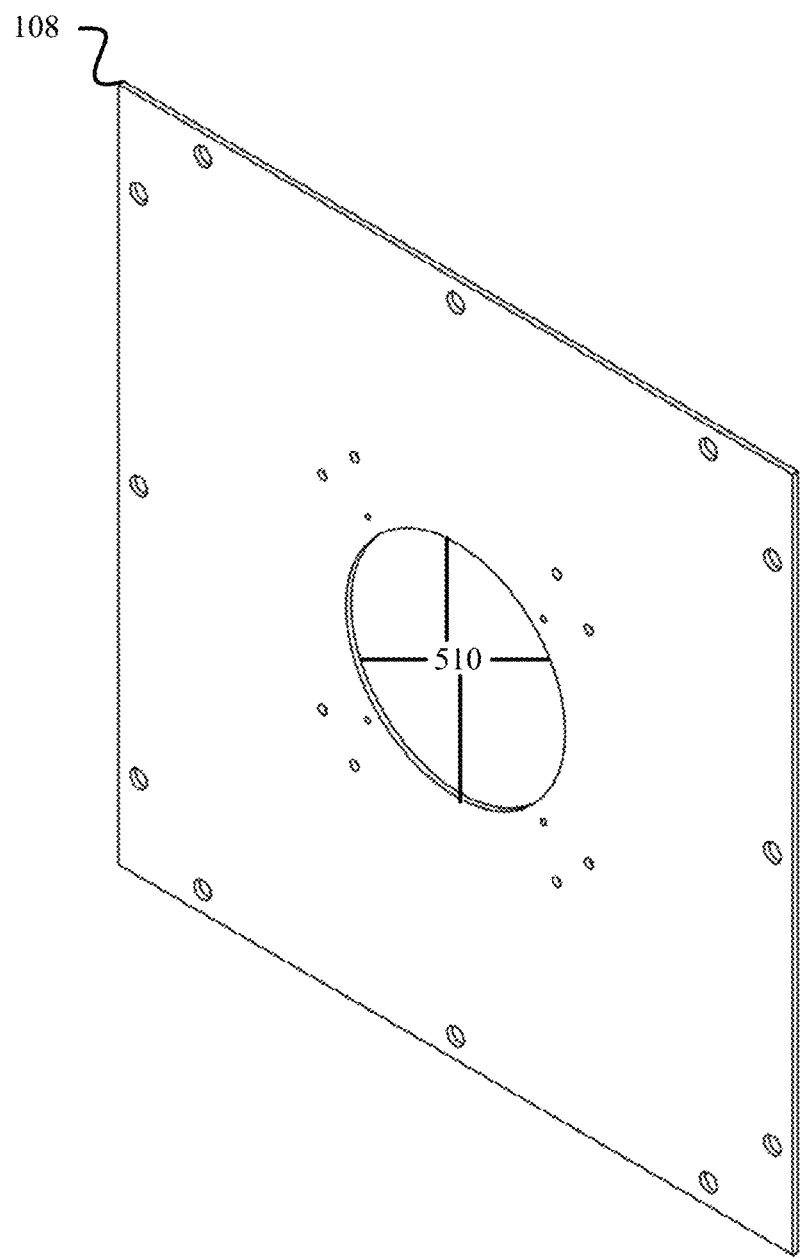
FIG. 8 illustrates an example of the ACB inlet cover with a rectangular or square shape in accordance with some embodiments presented herein.

FIG. 8 illustrates an example of inlet cover 108 with a rectangular or square shape. ACB 100 may be configured with inlet cover 108 having the rectangular or square shape when ACB 100 is to be mounted or connected to a rectangular or square shaped exhaust, vent, or duct. Inlet cover 108 may have round, oval, trapezoidal, rhombus, hexagonal, or other shapes when mounting or connecting ACB 100 to tubing, exhausts, vents, ducts, and/or other structures of a corresponding shape.

Impeller 106 may be fan or rotor that is mounted onto impeller mount 506 and that is disposed centrally within housing 104 between clean-side cover 102 and inlet cover 108. When activated, a motor spins or rotates a plurality of blades that extend centrally from impeller 106. The motor may be located at the center of impeller 106 (e.g., integrated with impeller 106 to provide a powered impeller), or may be located outside ACB 100, in front or in back, and may power the rotating blades via a shaft or pulley system.

Figure 9:
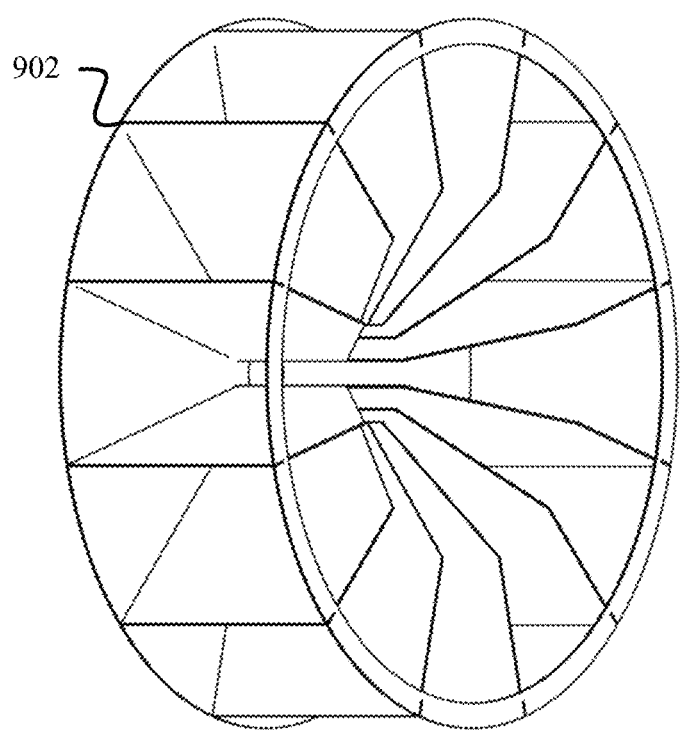
FIG. 9 illustrates different examples of the impeller in accordance with some embodiments presented herein.
Figure 9:
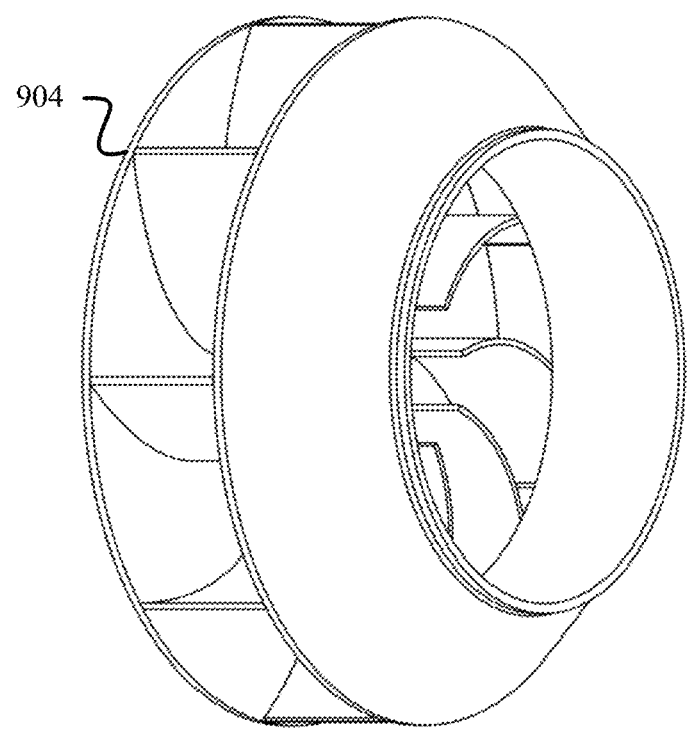

FIG. 9 illustrates different examples of impeller 106 in accordance with some embodiments presented herein. ACB 100 may be configured with first impeller having a set of flat, radial, and/or angular blades 902 or second impeller having a set of curved or concave blades 904.

Rotation of impeller 106 may induce suction that draws in the particular-pervaded air or gas from the surrounding environment through central opening 510 of inlet cover 108 into a center of impeller 106, which opening may or may not have an inlet ring to guide the entering air or gas. Rotation of impeller 106 may also accelerate the particulate-pervaded air or gas from the center of impeller 106 outwards to the interior side of the exterior walls of housing 104. Specifically, the rotation of impeller 106 may create a centrifugal force that pushes the particulate-pervaded air or gas towards the interior side of the exterior walls of housing 104. The pushing of the particulate-pervaded air or gas towards the interior side of the exterior walls of housing 104 increases the pressure and/or flow within ACB 100 and creates different pressure zones within ACB 100 to induce the heavier and/or denser particulates to occupy the space adjacent to the inner sides of the exterior walls of housing 104 and the lighter and/or less dense air or gas to occupy the space closer to impeller 106.

The heavier particulates separate from the lighter air or gas and become trapped about and travel along the interior side of the exterior wall of housing 104 until the particulates circulate to and are ejected out of particulate outlet 508. The lighter air or gas is unable to infiltrate the high-pressure zone created by the heavier particulates, and circulates about the center of ACB 100 until being ejected through the cleaned air or gas outlet in the clean-side cover, if any, provided by apertures 502.

Figure 10:
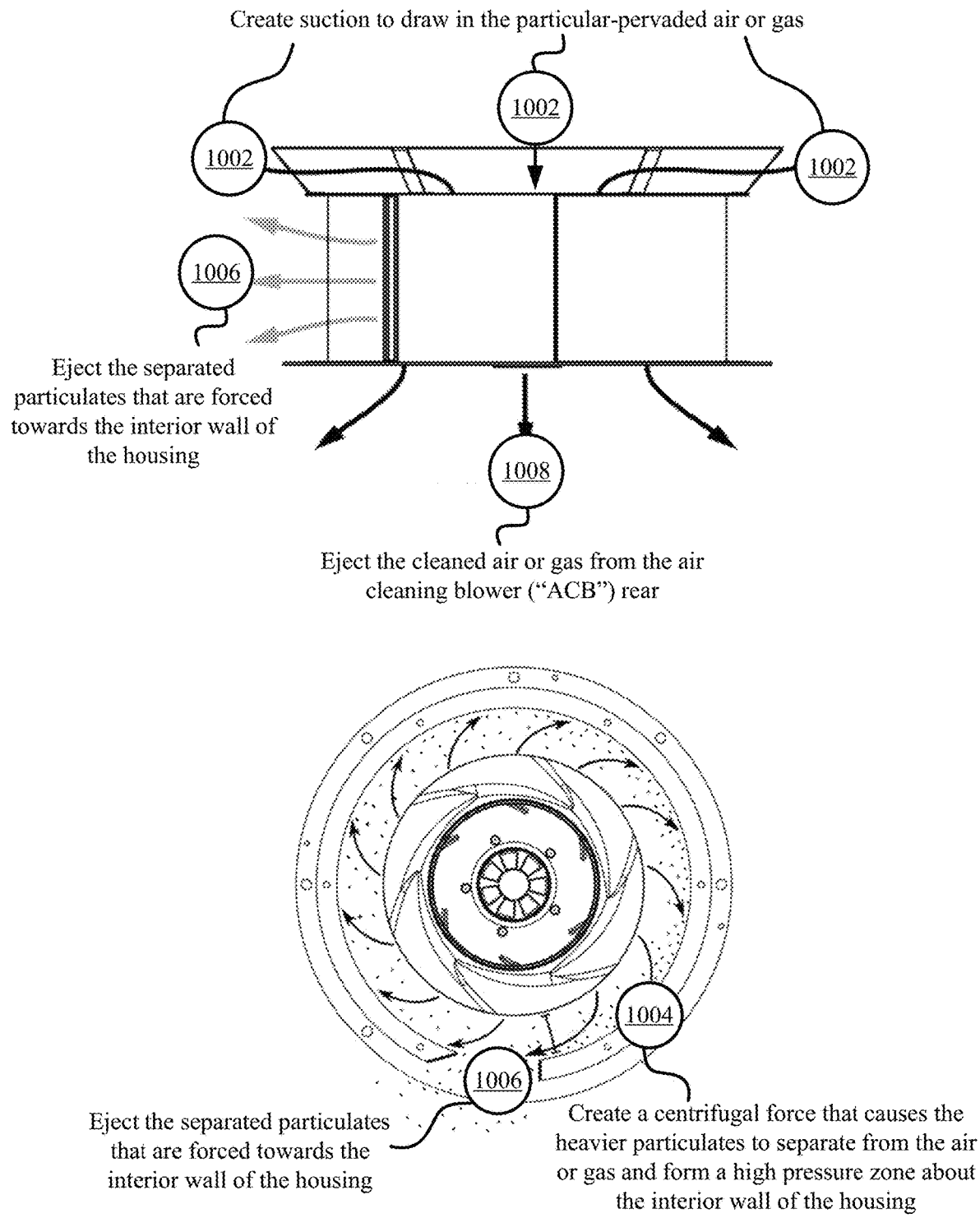
FIG. 10 illustrates example operation of the ACB in separating particulates from air or gas in accordance with some embodiments presented herein.

FIG. 10 illustrates example operation of ACB 100 in separating particulates from air or gas in accordance with some embodiments presented herein. As shown in FIG. 10, rotation of impeller 106 creates (at 1002) suction that draws in particulate-pervaded air or gas through central opening 510 of inlet cover 108.

In some embodiments, central opening 510 may be connected to a duct, exhaust, pipes, or tubing such that the particulate-pervaded air or gas is received from the duct, exhaust, pipes, or tubing. In some embodiments, central opening 510 may be exposed to an outside environment such that the particulate-pervaded air or gas is received from the outside environment.

Impeller 106 increases the pressure within ACB 100 by accelerating the particulate-pervaded air or gas outwards from the center of impeller 106 which creates (at 1004) a centrifugal force that causes the heavier particulates to separate from the air or gas in a high-pressure zone about the interior side of the exterior wall of housing 104. The lighter cleaned air or gas cannot penetrate the high-pressure zone where the heavier particulates are forced against the interior side of the exterior wall of housing 104. Accordingly, the lighter cleaned air or gas may reflect back towards the center of ACB 100.

The separated particulates may circulate about the inside of the exterior wall of housing 104 until the particulates reach and are ejected (at 1006) out from particulate outlet 508 about the side of ACB 100. The cleaned air or gas may circulate closer to impeller 106 and away from the interior side of the exterior walls of housing 104 until reaching and exiting (at 1008) out the cleaned air or gas outlet provided by apertures 502 about the rear of ACB 100.

Other structures may be added to, combined with, and/or otherwise used to modify ACB 100 to improve the efficiency and efficacy of ACB 100. In some embodiments, ACB 100 may be modified to include dust flaps, chutes, and/or debris-discharge channels.

Figure 11:
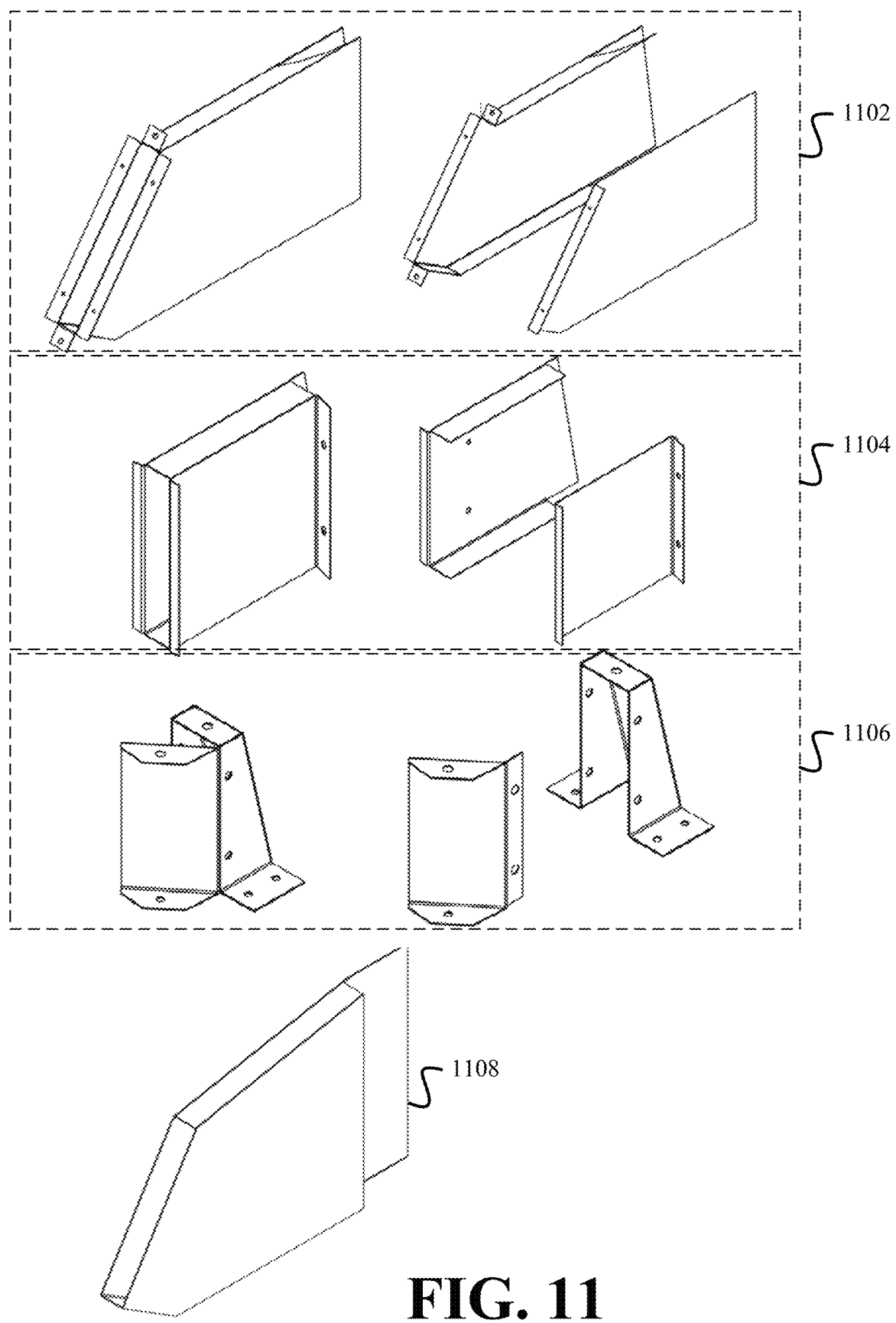
FIG. 11 illustrates different examples of debris-discharge channels and flaps that may be attached to the particulate outlet of the ACB in accordance with some embodiments presented herein.

FIG. 11 illustrates different examples of debris-discharge channels and flaps that may be attached to particulate outlet 508 of ACB 100 in accordance with some embodiments presented herein. For instance, FIG. 11 provides an assembled and exploded view of debris-discharge channel 1102, an assembled and exploded view of debris-discharge channel 1104, flap 1106, and flap 1108 that have different shapes and sizes to match different shapes and sizes of particulate outlet 508.

Debris-discharge channels 1102 and 1104 and flaps 1106 and 1108 may provide an enclosed or covered extension that directs the ejected particulates and/or debris away from ACB 100, to a particular destination that may include a collection receptacle or ducting that carries the particulates outside of an enclosed space or environment, and/or to a recipient. In some embodiments, the debris-discharge channel (e.g., 1102, 1104, 1106, 1108 or any other configuration) may extend partially inside housing 104. For instance, the width of debris-discharge channel 1102 may match or be slight smaller than the width of particulate outlet 508 in order to attach to or fit inside the particulate outlet 508.

Figure 12:
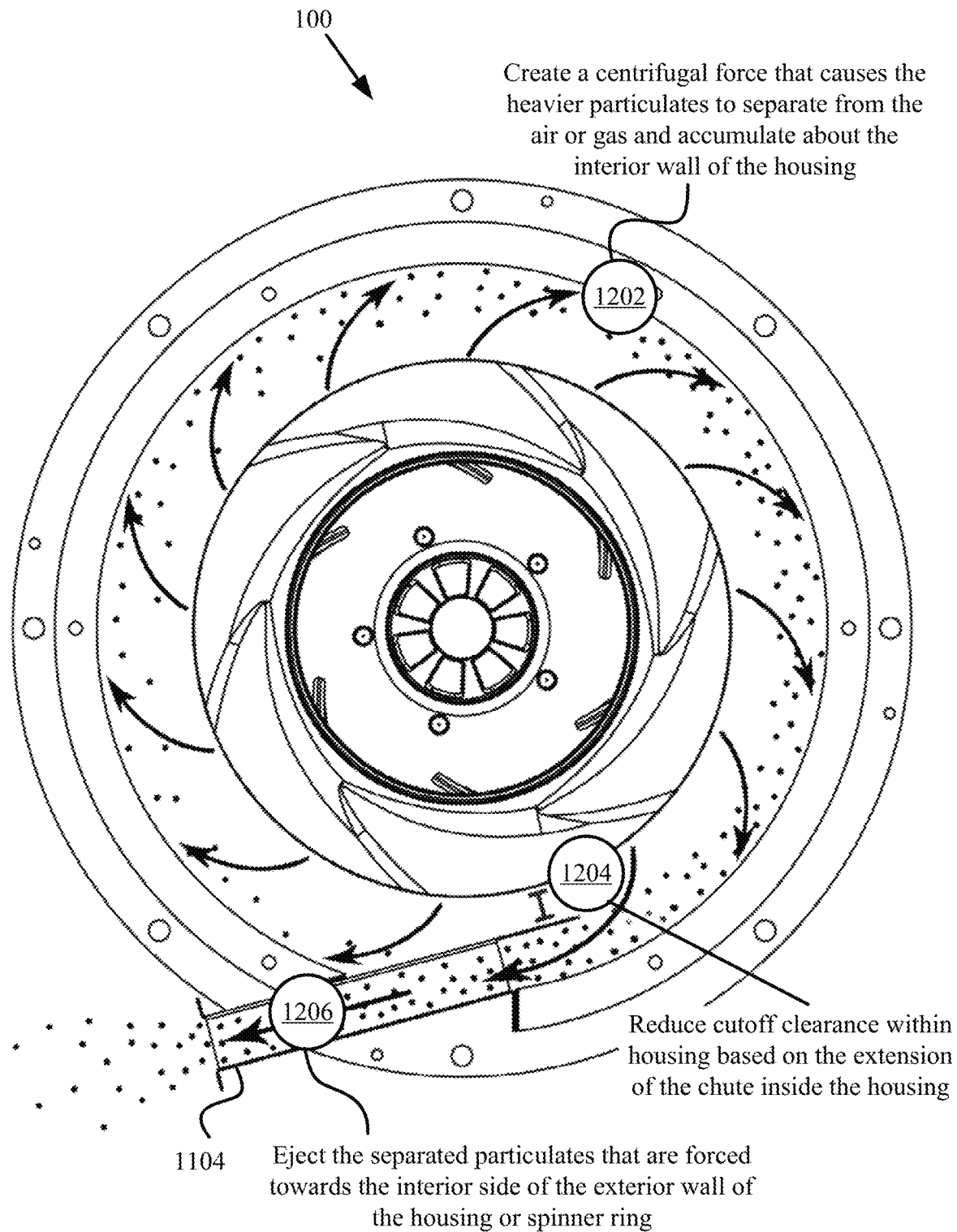
FIG. 12 illustrates operation of the ACB coupled with the debris-discharge channel that extends inside the housing in accordance with some embodiments presented herein.

FIG. 12 illustrates operation of ACB 100 coupled with debris-discharge channel 1104 that extends inside housing 104 in accordance with some embodiments presented herein. Rotation of impeller 106 creates suction that draws in the particulate-pervaded air or gas, and creates (at 1202) a centrifugal force within the volume created between clean-side cover 102, spinner ring or housing 104, and inlet cover 108. The centrifugal force causes the heavier particulates to separate from the lighter air or gas, and to accumulate about the inside of the exterior wall of spinner ring or housing 104. The extension of debris-discharge channel 1104 inside spinner ring or housing 104 may have a flap to reduce (at 1204) the total cutoff clearance within spinner ring or housing 104, thereby more effectively trapping and ejecting (at 1206) the debris and/or particulates that are not forced all the way to and against the interior side of the exterior wall of spinner ring or housing 104.

Figure 13:
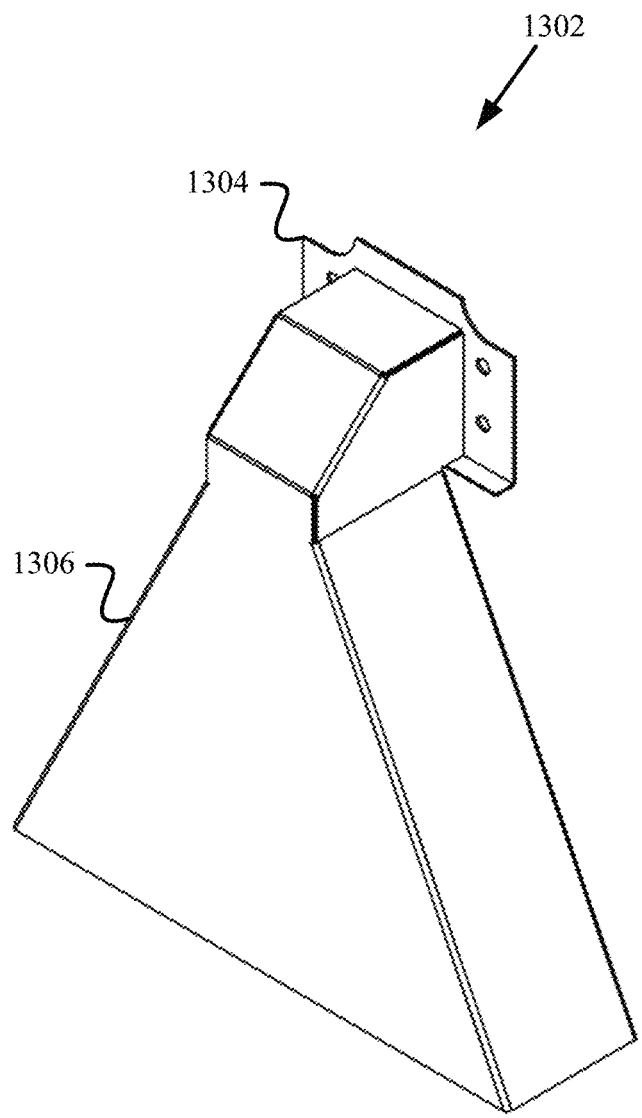
FIG. 13 illustrates an example debris-discharge downspout for the ACB in accordance with some embodiments presented herein.

FIG. 13 illustrates an example debris-discharge downspout for ACB 100 in accordance with some embodiments presented herein. Downspout 1302 may include bracket 1304 for attaching to particulate outlet 508, debris-discharge channel 1102 or 1104, flaps 1106 or 1108, and/or any other configurations. Enclosure 1306 may extend out and away from bracket 1304 to direct the ejected particulates away from ACB 100. As shown in FIG. 13, downspout 1302 may include a 90 degree fitting that connects bracket 1304 to enclosure 1306, and enclosure 1306 may be in the form of a duct or inverted funnel.

Downspout 1302 may be fitted with a bag or receptacle for collecting the ejecting particulates and for preventing the ejected particulates from reentering the outside environment. In some embodiments, downspout 1302 may include flanges that connect downspout 1302 to ducting or other terminations.

Different hoods, screens, and/or grilles may be attached to ACB 100. The different hoods, screens, and/or grilles may prevent and/or block intake of undesired materials and/or objects, may redirect air flowing into ACB 100, and/or may adjust the airflow coming into ACB 100.

Figure 14:
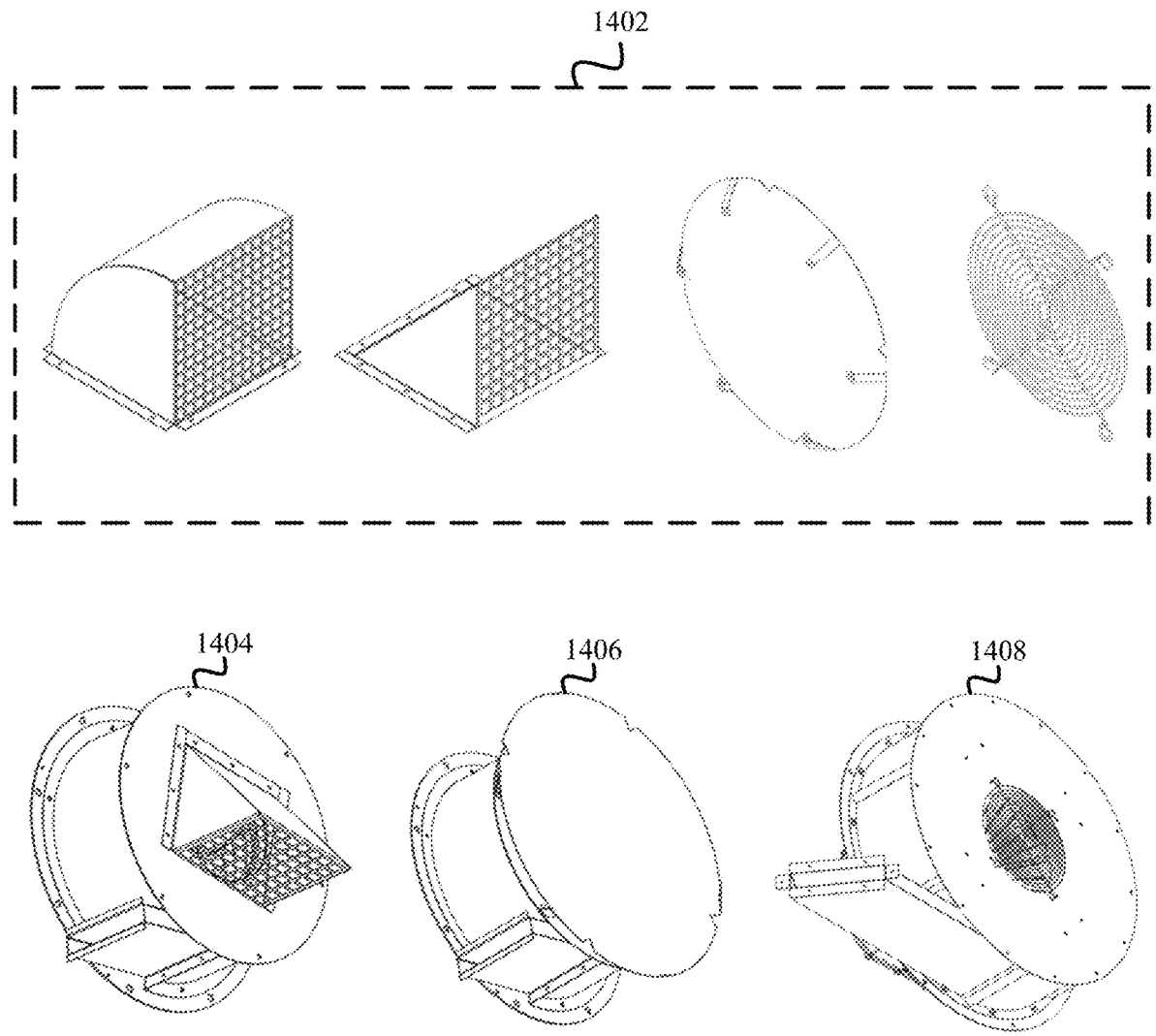
FIG. 14 illustrates examples of various inlet hoods for the ACB in accordance with some embodiments presented herein.

FIG. 14 illustrates examples of various inlet hoods 1402 for ACB 100 in accordance with some embodiments presented herein. Inlet hoods 1402 may be placed over central opening 510 for the particulate-pervaded air or gas inlet of ACB 100, and may be secured to inlet cover 108 to block unwanted elements from entering ACB 100. Specifically, each inlet hood 1402 with associated screen or grille may include a lip or flange with a set of mounting holes that are aligned with mounting holes about inlet cover 108. Screws, nuts and bolts, welding, adhesives, and/or other fasteners may be used to securely mount inlet hood 1402 over central opening 510 of inlet cover 108.

Each inlet hood 1402 may include a screen of a different shape, pattern, and/or material that prevents rain, mist, other liquids, objects, or particulates of larger sizes from entering into ACB 100. Inlet hoods 1402 may also be used to prevent harm to humans and animals by preventing them from entering into ACB 100 and/or contacting impeller 106. ACB 1404 is illustrated with a first hood, ACB 1406 is illustrated with a second inlet hood, and ACB 1408 is illustrated with a third inlet grille which may be used in some configurations to save space.

Figure 15:
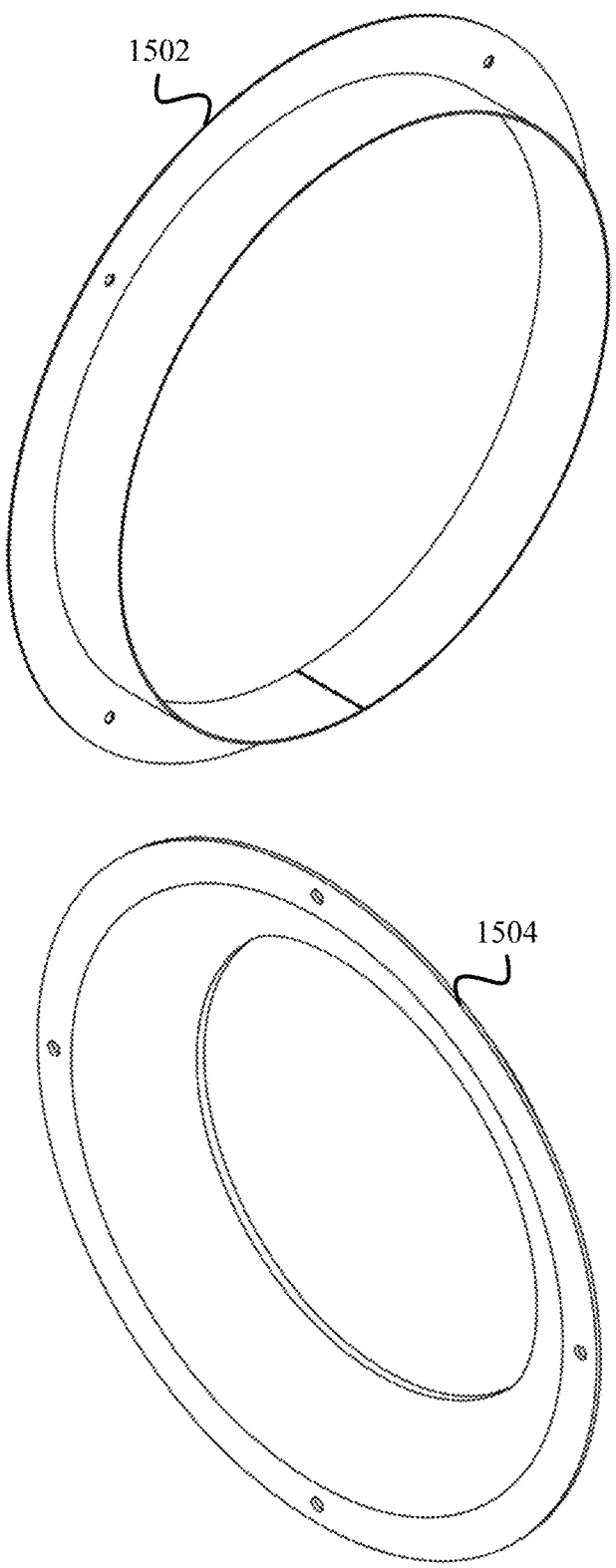
FIG. 15 illustrates examples of various inlet rings for the ACB in accordance with some embodiments presented herein.

FIG. 15 illustrates examples of various inlet rings 1502 and 1504 for ACB 100 in accordance with some embodiments presented herein. Inlet rings 1502 and 1504 may be mounted or attached to inlet cover 108. Specifically, inlet rings 1502 and 1504 may connect to central opening 510 of inlet cover 108 in order to increase, organize, and direct the airflow coming into ACB 100 through inlet cover 108. As shown in FIG. 15, inlet rings 1502 and 1504 may include cylindrical or conical extension that directs or funnels the particulate-pervaded air or gas into the intake of impeller 106. Inlet rings 1502 and 1504 may vary in geometry and size depending on the geometry and size of inlet cover 108, the geometry and size of impeller 106, and/or the desired air flow to impeller 106. Accordingly, inlet rings of ACB 100 may be formed in other shapes and/or proportions.

Figure 16:
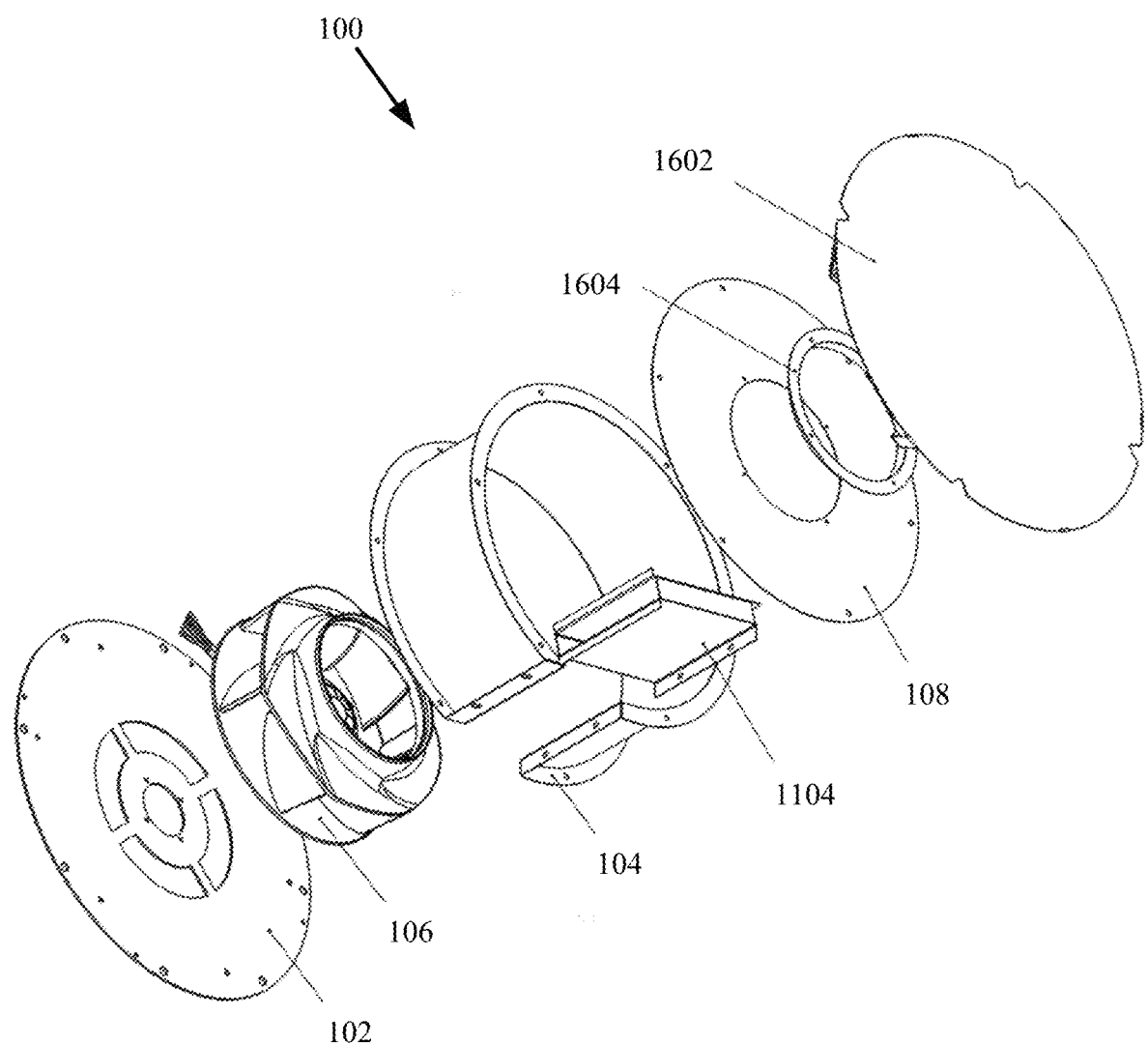
FIG. 16 illustrates an exploded view of the ACB configured with a first inlet hood, inlet ring, and debris-discharge channel in accordance with some embodiments presented herein.
Figure 17:
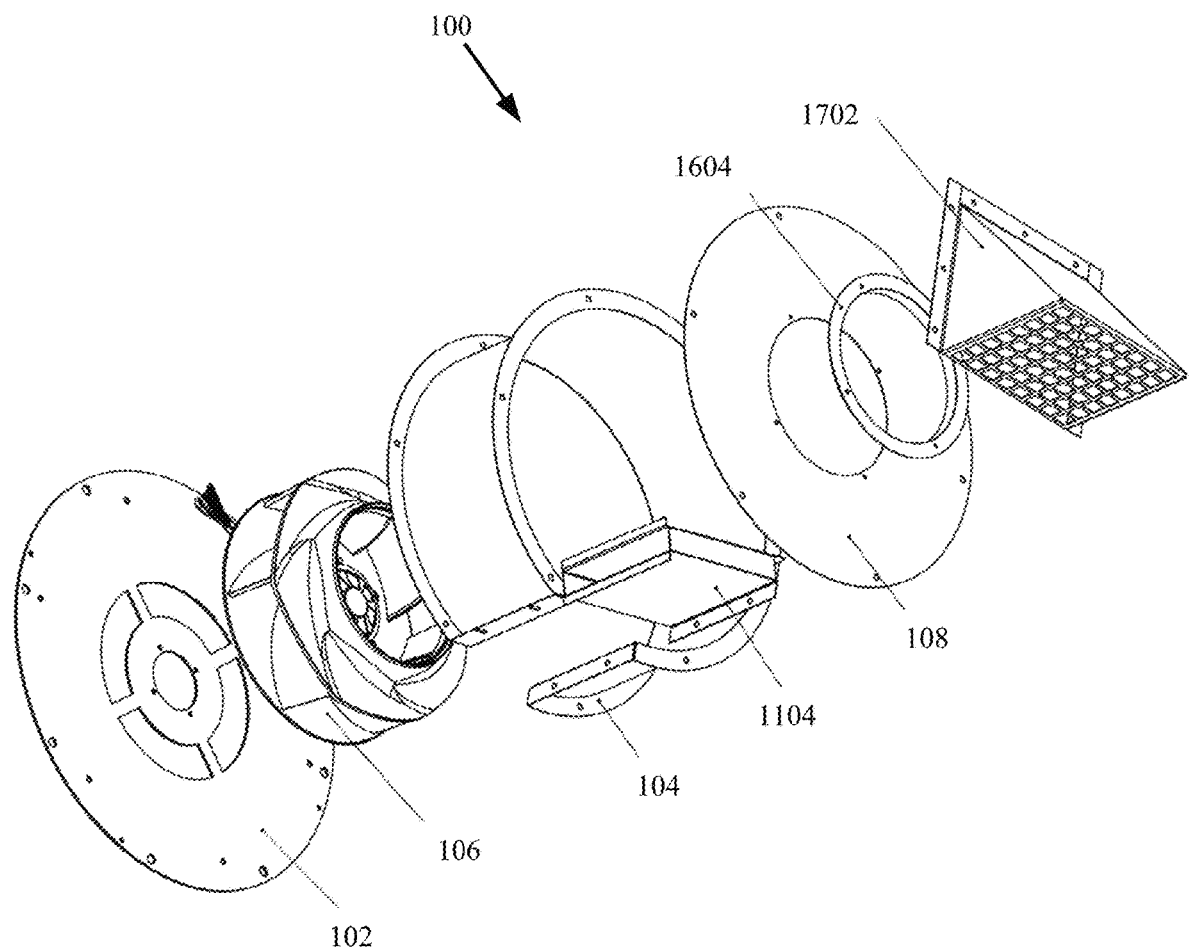
FIG. 17 illustrates an exploded view of the ACB configured with a second inlet hood, inlet ring, and debris-discharge channel in accordance with some embodiments presented herein.
Figure 18:
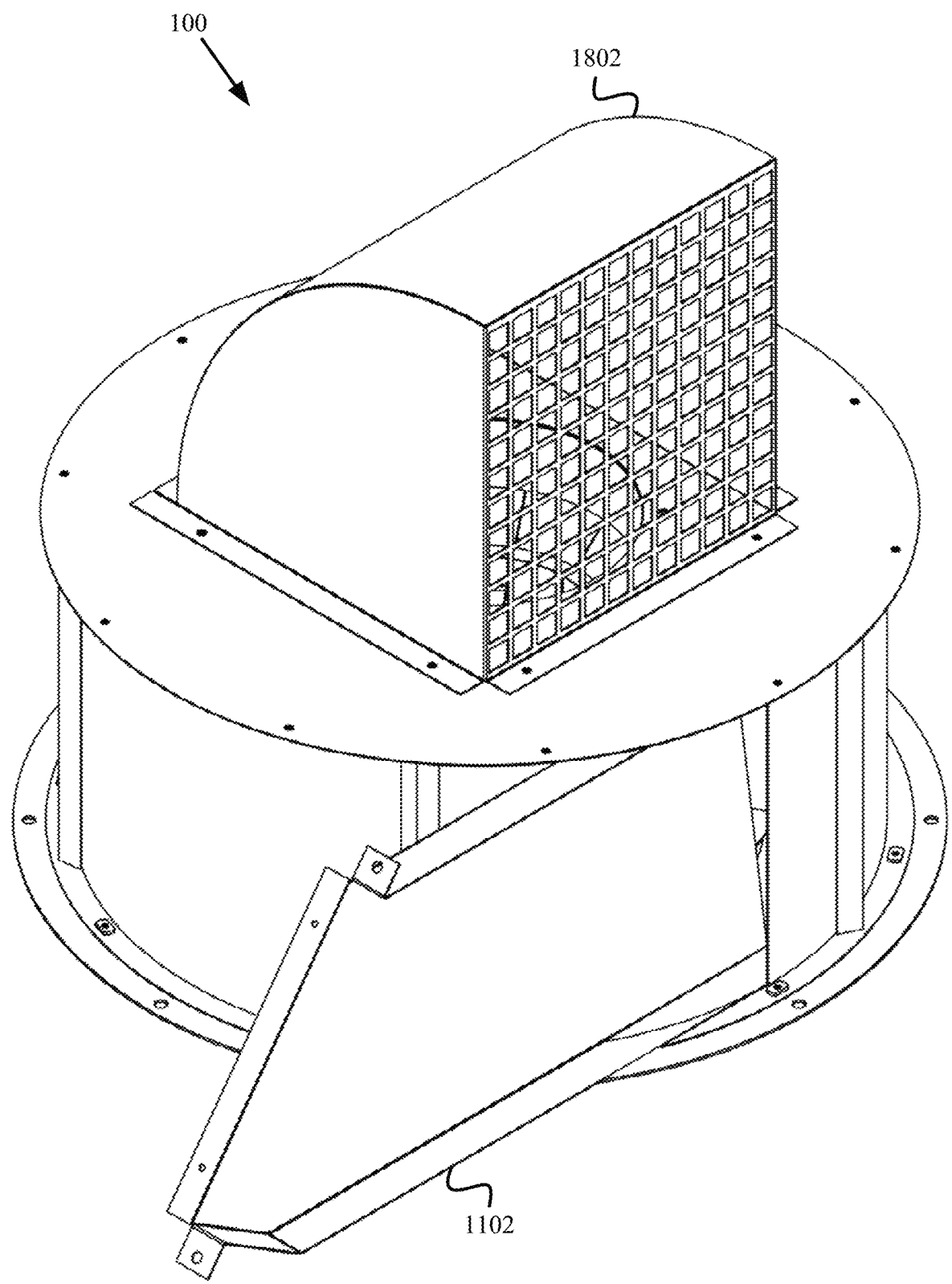
FIG. 18 illustrates an assembled view of the ACB configured with a third inlet hood and different/partial debris-discharge channel in accordance with some embodiments presented herein.

Accordingly, ACB 100 may be assembled with different interchangeable parts. The different assemblies or configurations of ACB 100 do not change the overall air or gas cleaning operation of ACB 100. The different assemblies or configurations may, however, alter the flow and direction of the discharged debris and/or particulates as well as those of the cleaned air or gas. For instance, FIG. 16 illustrates an exploded view of ACB 100 configured with first inlet hood 1602, inlet ring 1604, and debris-discharge channel 1104 in accordance with some embodiments presented herein. FIG. 17 illustrates an exploded view of ACB 100 configured with second inlet hood 1702, inlet ring 1604, and debris-discharge channel 1104 in accordance with some embodiments presented herein. FIG. 18 an assembled view of ACB 100 configured with third inlet hood 1802 and inner half of debris-discharge channel 1102 in accordance with some embodiments presented herein.

Figure 19:
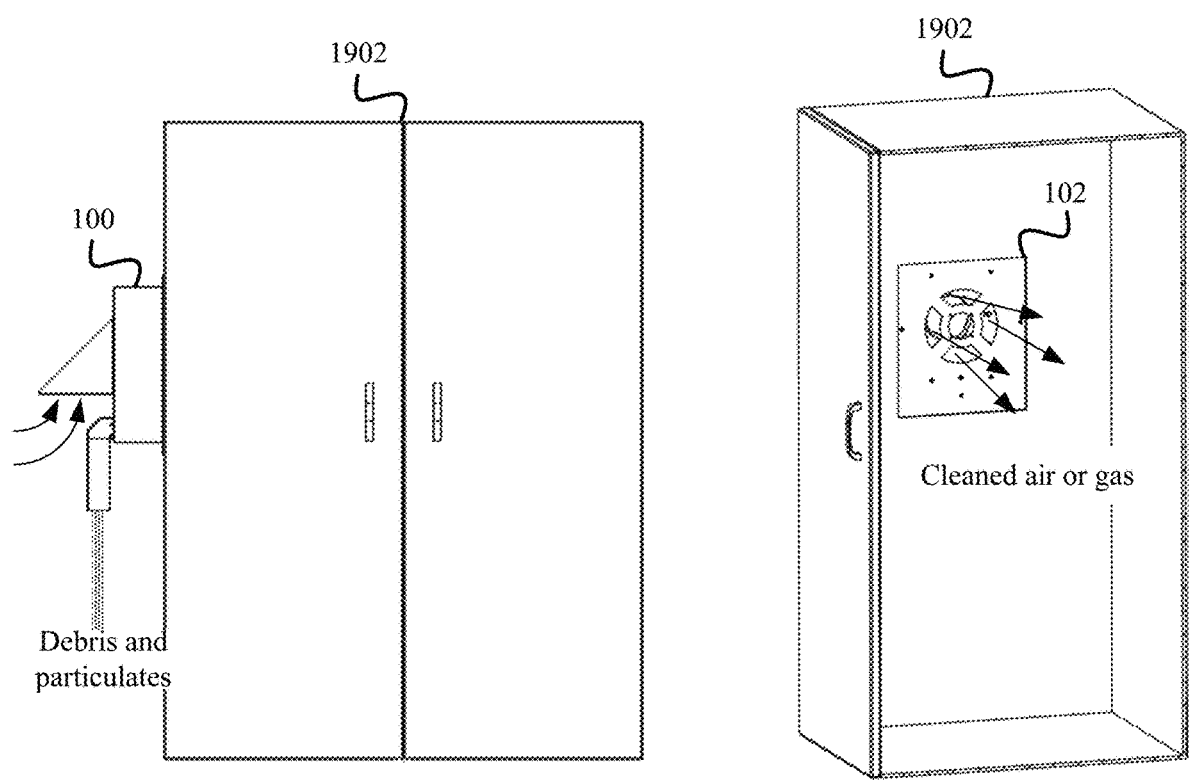
FIG. 19 illustrates mounting the ACB onto the exterior of a cabinet or enclosure in accordance with some embodiments presented herein.

In some embodiments, the different assemblies or configurations of ACB 100 may alter the size and shape of the various inlets, outlets, and ACB 100 itself so that ACB 100 may be coupled to different structures, motors, ducts, etc. For instance, FIG. 19 illustrates mounting ACB 100 onto the exterior of cabinet or enclosure 1902 in accordance with some embodiments presented herein. As shown in FIG. 19, the clean-side cover 102 of ACB 100 may be mounted to a front wall or door, side wall, or top, bottom, or back wall of cabinet or enclosure 1902.

Cabinet or enclosure 1902 may contain electronics, equipment, and/or structures that require clean air to operate or that are to remain dust and dirt free, ventilated, purged, and/or pressurized. By mounting ACB 100 to cabinet or enclosure 1902, ACB 100 may receive air or gas from outside cabinet or enclosure 1902, may separate the debris and/or particulates from the received air or gas, may supply a constant positive pressure of clean air or gas through cabinet or enclosure 1902, and may capture and eject the separated debris or unwanted particulates out the downspout, debris-discharge channel, or particulate outlet of ACB 100 that remains outside of cabinet or enclosure 1902.

Figure 20:
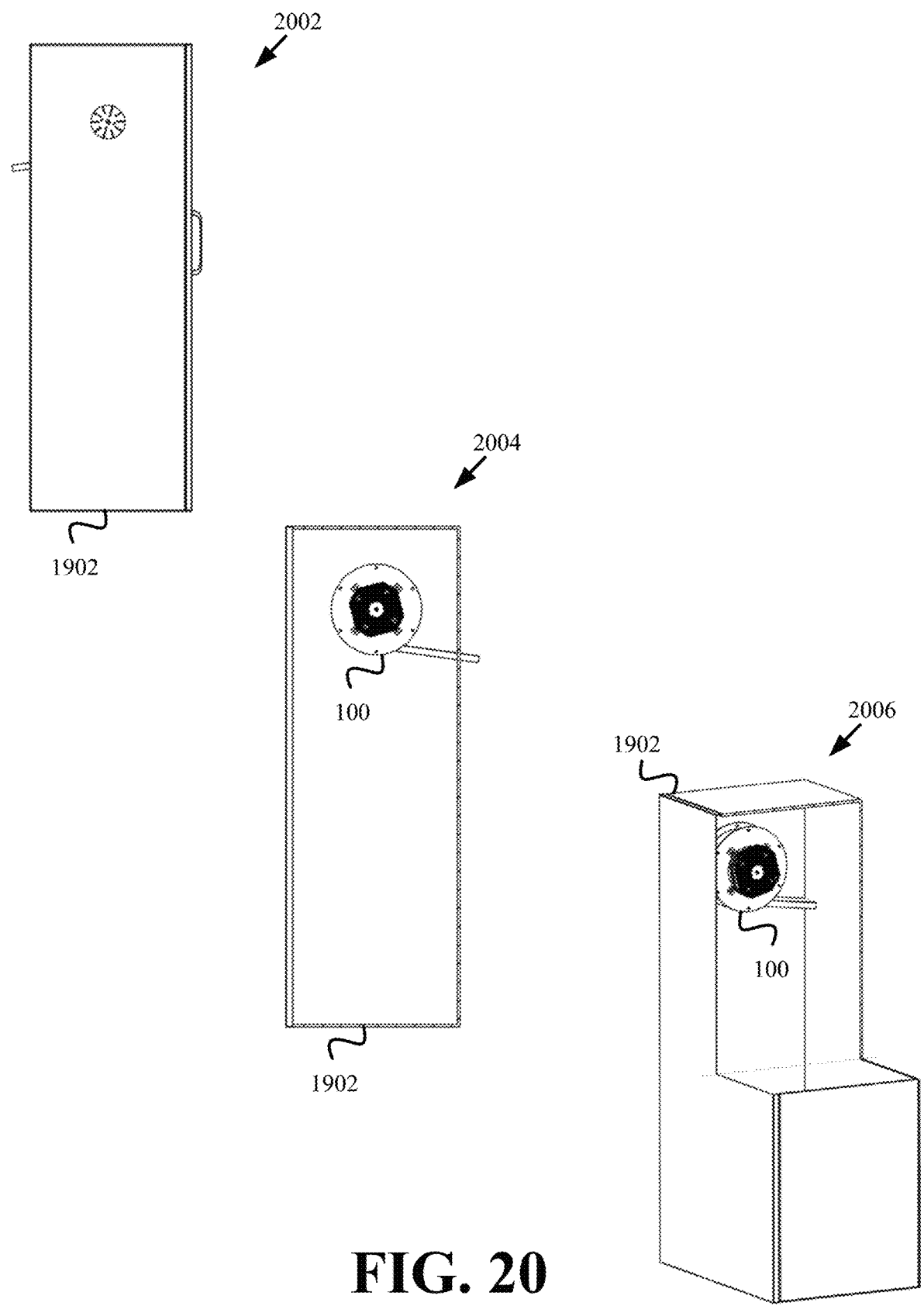
FIG. 20 illustrates mounting the ACB within a cabinet or enclosure in accordance with some embodiments presented herein.

FIG. 20 illustrates mounting ACB 100 within cabinet or enclosure 1902 in accordance with some embodiments presented herein. Specifically, FIG. 20 provides exterior side view 2002, interior side view 2004, and cutaway perspective view 2006 for the mounting of ACB 100 within cabinet or enclosure 1902. The intake of ACB 100 remains exposed to the environment outside cabinet or enclosure 1902 and the downspout, debris-discharge channel, or particulate outlet of ACB 100 may be routed to an opening about cabinet or enclosure 1902 that allows the separated debris and/or particulates to be ejected to the outside environment.

Figure 21:
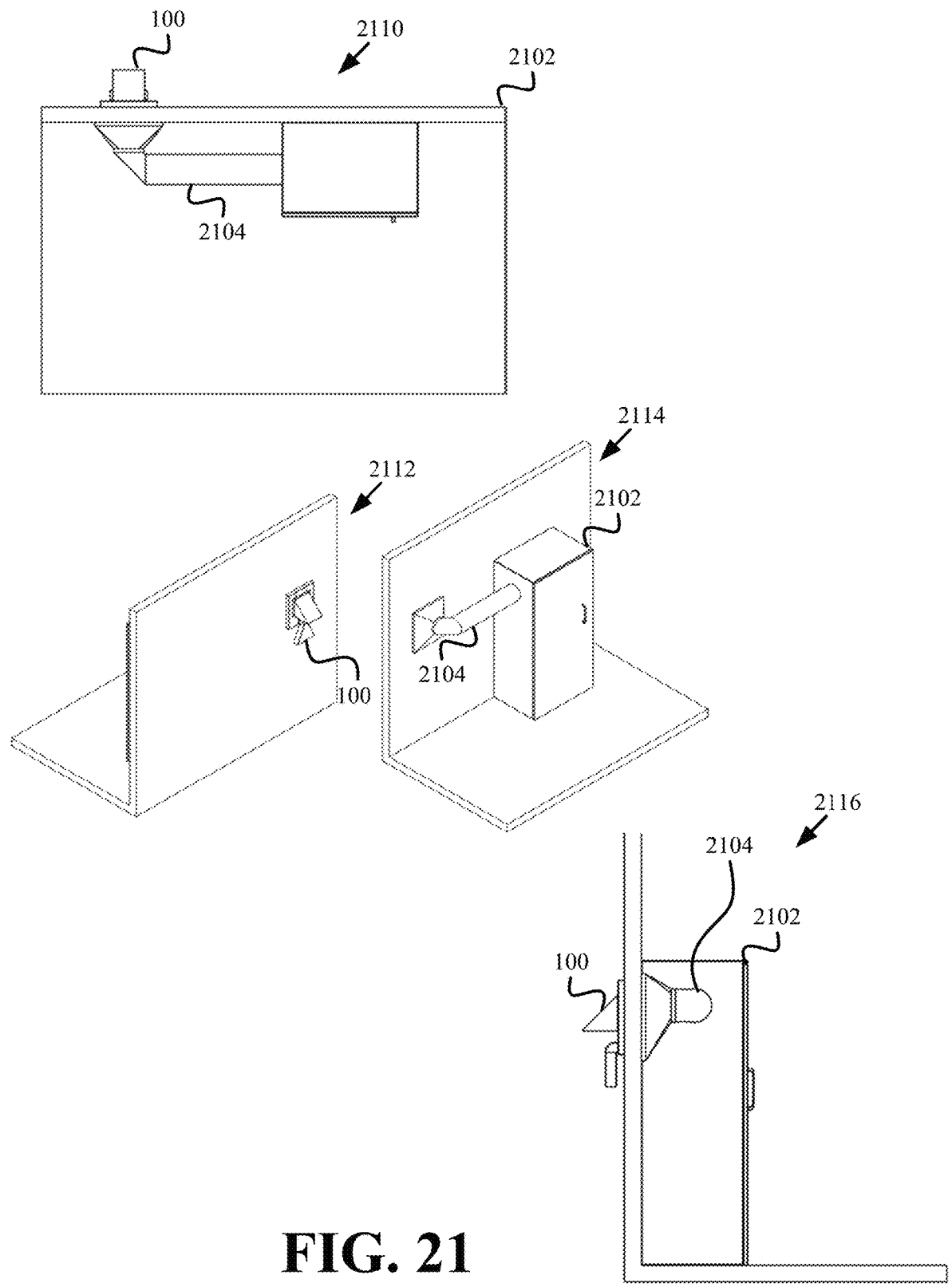
FIG. 21 illustrates an example of connecting the ACB to an enclosed space via ducting in accordance with some embodiments presented herein.

FIG. 21 illustrates an example of connecting ACB 100 to enclosed space 2102 via ducting 2104 in accordance with some embodiments presented herein. FIG. 21 presents an aerial or top view 2110 for remotely connected ACB 100, perspective views 2112 and 2114, and side view 2116 for remotely connected ACB 100.

In each of the views 2110, 2112, 2114, and 2116, ACB 100 may be mounted on a roof, under the floor, or on a wall of enclosed space 2102, and may feed the cleaned air or gas into enclosed space 2102 via ducting 2104 that is connected to clean-side cover 102. Ducting 2104 allows ACB 100 to be mounted remotely or away from vents or intakes of enclosed space 2102. Nevertheless, ACB 100 may receive air or gas from outside of enclosed space 2102, may separate the debris and/or particulates from the received air or gas, may supply a constant positive pressure of clean air or gas inside enclosed space 2102, and may capture and eject the separated debris or unwanted particulates out the downspout, debris-discharge channel, or particulate outlet of ACB 100.

Curtains or extensions may be attached to the cleaned air or gas outlet of ACB 100 to form a canopy or other configuration to more accurately direct the cleaned air or gas over a specific target, in desired directions, and/or, if a media filter, heat exchanger, or other device is incorporated into this extension, to modify the quality or characteristics of the cleaned air or gas. For instance, the curtains or extensions may create a cone or envelope of cleaned air or gas, and may direct the cleaned air or gas around a specific person or other target. Consequently, the particulate-pervaded air or gas from the surrounding environment may be prevented from entering into that cone or envelope of cleaned air or gas surrounding the protected person or other target, or the cone or envelope may trap and carry the particulate-pervaded air or gas away from the protected target.

Figure 22:
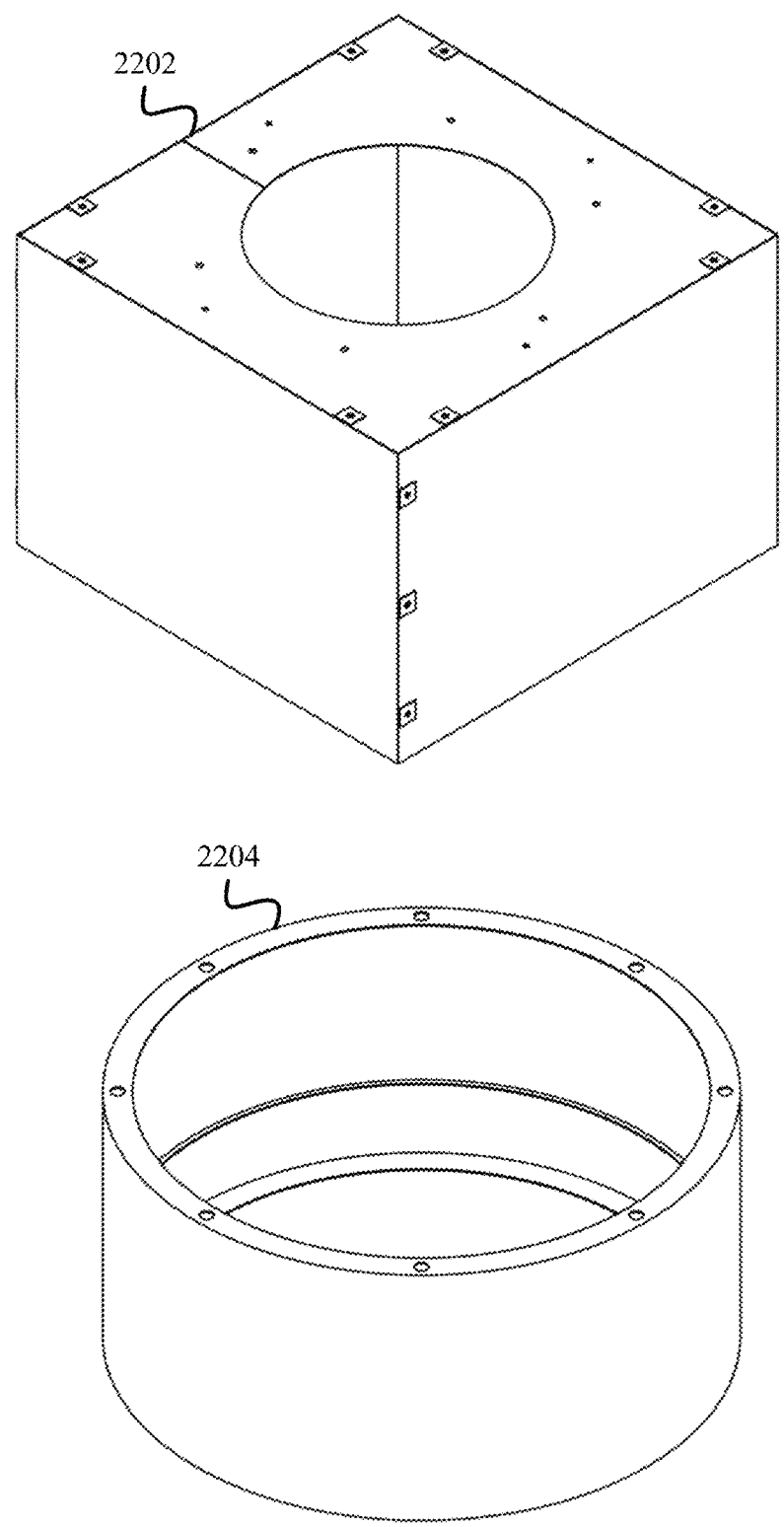
FIG. 22 illustrates examples of different curtains or extensions that may form protective cones or envelopes of clean air or gas in accordance with some embodiments presented herein.

FIG. 22 illustrates examples of different curtains or extensions 2202 and 2204 for ACB 100 that may form protective cones or envelopes of clean air or gas in accordance with some embodiments presented herein. Curtains or extensions 2202 and 2204 may be mounted to a rear or backside of clean-side cover 102, or directly to housing 104 of ACB 100 if there is no clean-side cover 102, and may include one or more openings that align with apertures 502 of clean-side cover 102. Curtains or extensions 2202 and 2204 may include protrusions that extend out from clean-side cover 102. The protrusions may be rigid or flexible, and may focus the cleaned air or gas exiting ACB 100 onto a desired target. For instance, curtain or extension 2202 is illustrated with a square or rectangular protrusion, and curtain 2204 is illustrated with a cylindrical protrusion. In some embodiments, curtains or extensions 2202 and 2204 may be used as fittings or extensions to connect ACB 100 to ducting, tubing, piping, and/or other intakes.

In some embodiments, curtains or extensions 2202 and 2204 may include filter media to modify the quality and characteristics of the air exiting ACB 100. The filter media may provide a secondary filtration to capture smaller or lighter particulates (e.g., bacteria, mold spores, etc.) that may not have been separated from the air or gas by ACB 100 or gases not removed by ACB 100.

Figure 23:
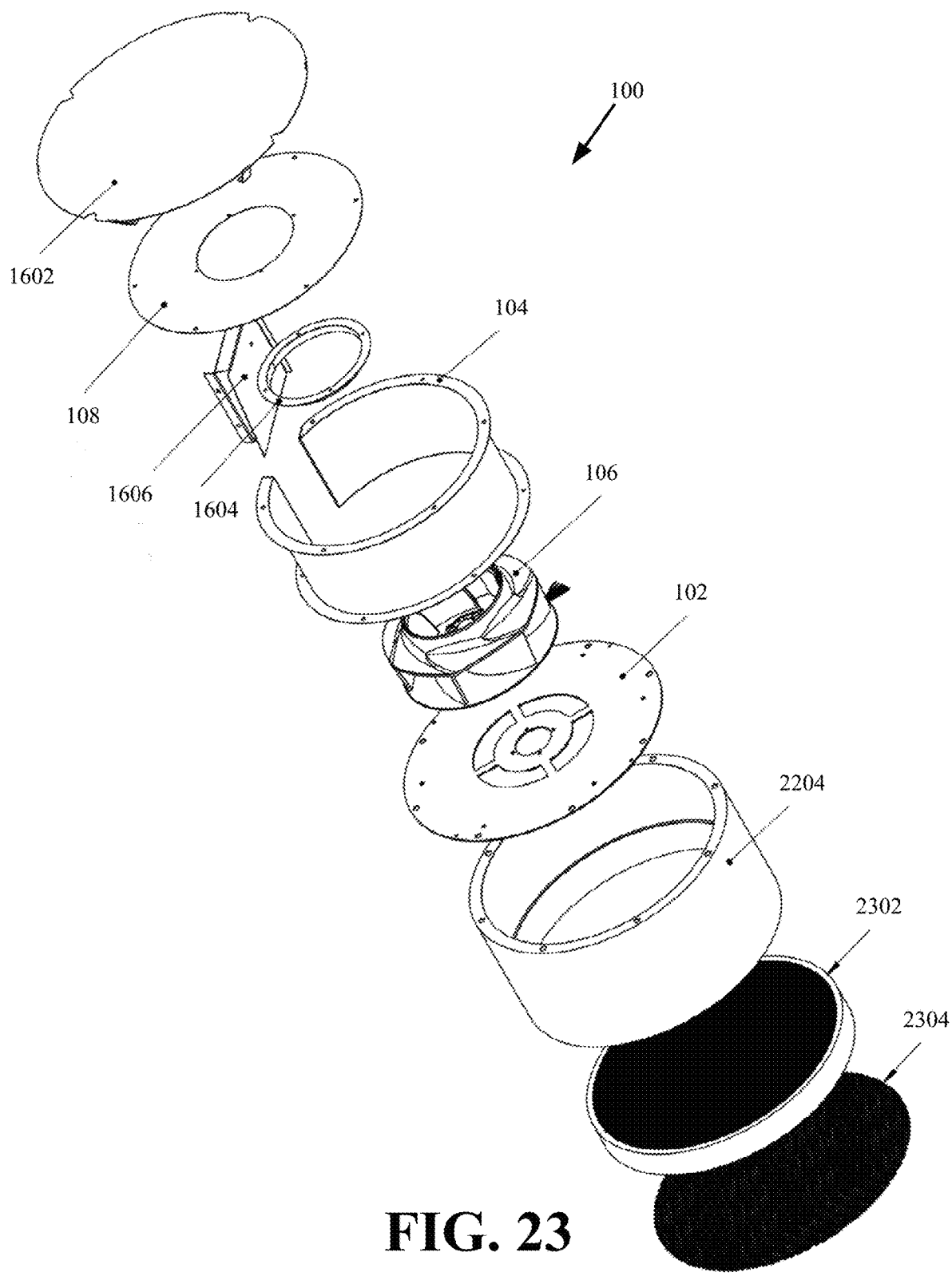
FIG. 23 illustrates an exploded view of the ACB configured with a curtain, filter media, and a grate in accordance with some embodiments presented herein.

FIG. 23 illustrates an exploded view of ACB 100 configured with curtain or extension 2204, filter media 2302, and grate 2304 in accordance with some embodiments presented herein. As shown in FIG. 23, curtain or extension 2204 may include a lip that is perpendicular to the vertical extension. The lip may include a set of mounting holes that align with holes about clean-side cover 102. Screw, nuts and bolts, and/or other fasteners may be used to couple curtain or extension 2204 to clean-side cover 102. Filter media 2302 may include a material or fabric that traps particulates and/or gases exiting out the cleaned air or gas outlet of ACB 100. For instance, filter media 2302 may be made of fiberglass, pleated cotton, activated charcoal, desiccant, and/or other materials to further treat the cleaned air or gas output from ACB 100. Filter media 2302 may be inserted into curtain or extension 2204 and may be secured in place by grate 2304. In some embodiments, grate 2304 may include a cover that fits into curtain or extension 2204 from the discharge end or that screws onto the discharge end of curtain or extension 2204. In some embodiments, filter media 2302 may be placed into a tray, frame, or drawer that slides or rotates in and out from a side of ACB 100 or curtain or extension 2204.

Figure 24:
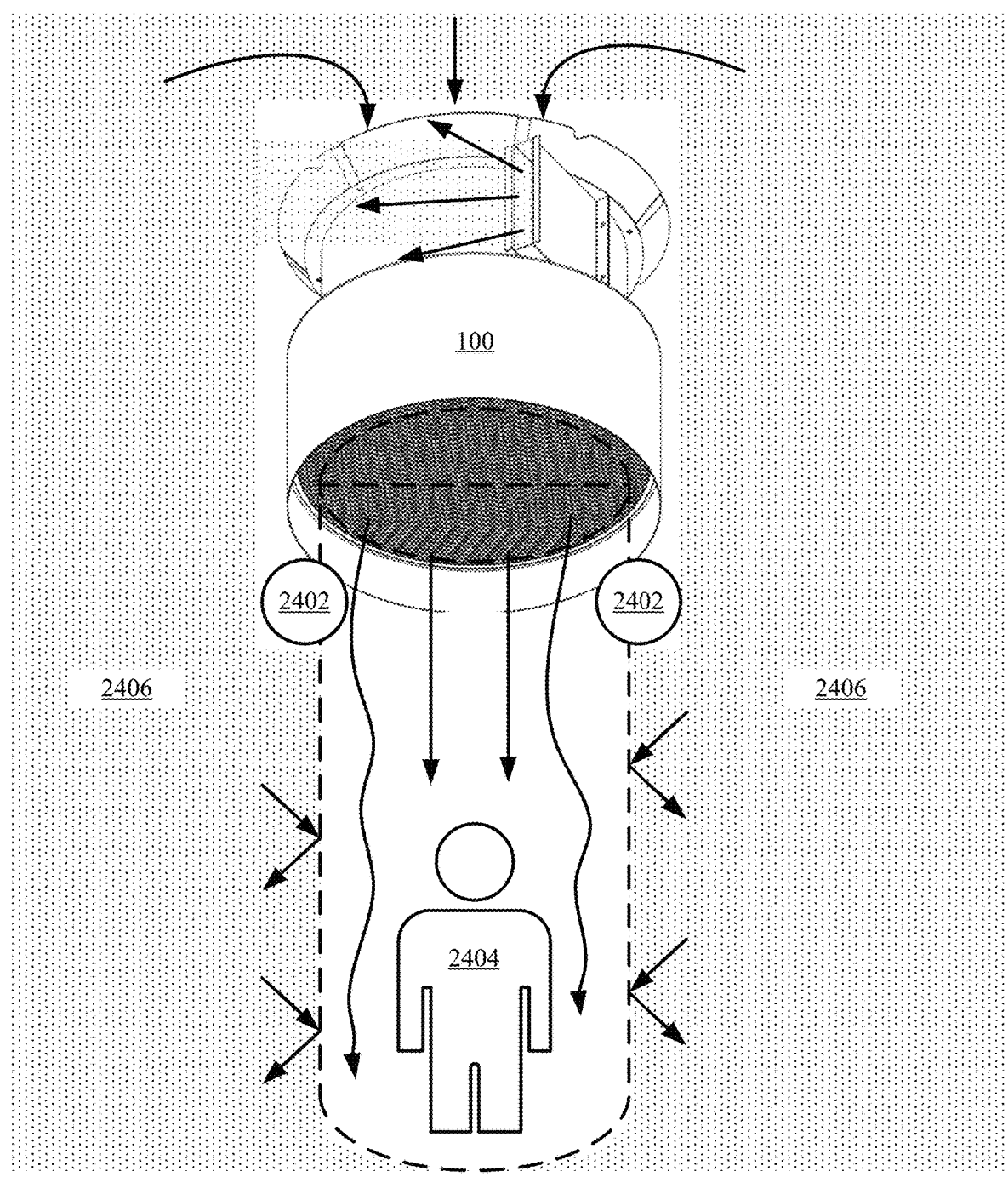
FIG. 24 illustrates the ACB generating a cone or envelope of clean air or gas over a particular target, human or otherwise, in accordance with some embodiments presented herein.

These and other structures may modify and/or enhance ACB 100 into a laminar flow machine that directs the flow of clean air or gas over a specific target (e.g., a surgical table)

while keeping the separated particulates and other particulates in the surrounding environment away from the specific target. FIG. 24 illustrates ACB 100 generating (at 2402) a cone or envelope of clean air or gas over particular target 2404 (e.g., a human or other object) in accordance with some embodiments presented herein.

Particular target 2404 may include a worker or work station in environment 2406 that is contaminated with various irritants, pollutants, and/or particulates. For instance, the worker may be positioned in an assembly line or factory next to one or more stations or persons that introduce harmful pathogens, particulates, gases, and/or other elements into the environment.

As shown in FIG. 24, ACB 100 may be positioned and oriented over a coal miner, other worker, work station, or traction motor of a locomotive or train car and may receive the particulate-pervaded air or gas from surrounding environment 2406, and may output cleaned air or gas around the worker or work station. Moreover, the pressure generated by pushing the cleaned air or gas around particular target 2404 may create a protective cone or envelope that blocks the particulate-pervaded air or gas within environment 2406 from reaching particular target 2404.

In some embodiments, clean-side cover 102, housing 104, impeller 106, inlet cover 108, and/or other structures of ACB 100 may be modified or replaced to adapt ACB 100 for different environments, settings, applications, and/or use cases. For instance, ACB 100 may be adapted to mount directly to an engine, motor, or other mechanical apparatus. In some such embodiments, ACB 100 may provide clean air or gas directly to the engine, motor, or other mechanical apparatus. The mounting may also couple the ACB to the engine, motor, or other mechanical apparatus such that the ACB's impeller (e.g., impeller 106) derives or receives its power from gears, shafts, pistons, belts, or other moving components of the coupled engine, motor, or apparatus.

Figure 25:
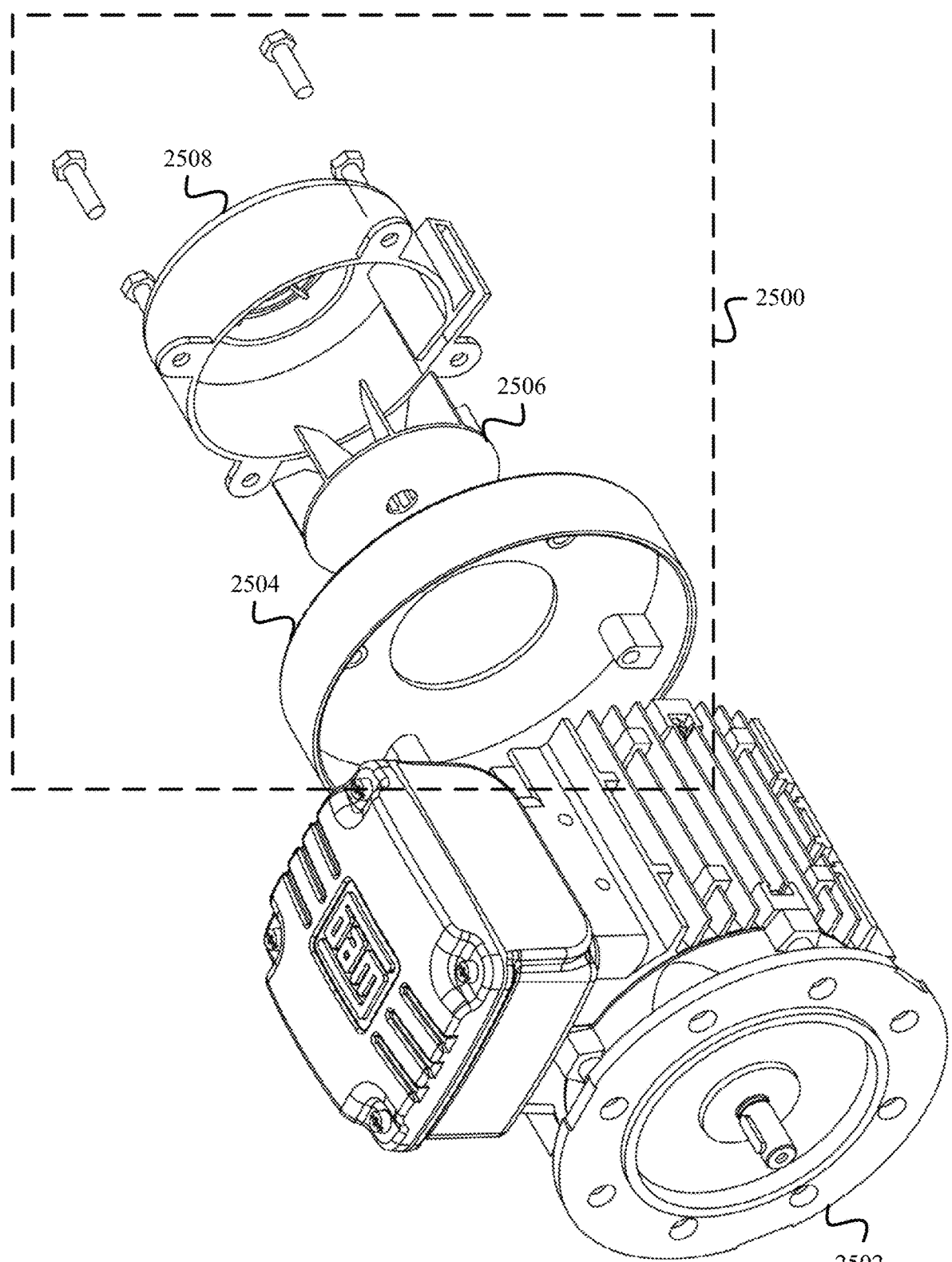
FIG. 25 illustrates modified structures for mounting the ACB directly to a host motor to allow the host motor to supply power to the ACB in accordance with some embodiments presented herein.

FIG. 25 illustrates modified structures for mounting ACB 2500 directly to motor 2502 to allow motor 2502 to supply power to ACB 2500 in accordance with some embodiments presented herein. ACB 2500 may be configured with modified clean-side cover 2504, impeller 2506, and modified housing 2508.

Modified clean-side cover 2504 may be used to secure ACB 2500 to motor 2502. Modified clean-side cover 2504 may include sides or extensions that extend out a modified clean-side cover 2504 or attach to a modified clean-side cover 2504. The extensions may provide a housing that fits over the intake of motor 2502 in order to direct the cleaned air or gas output from ACB 2500 into the intake of motor 2502 and/or to blow the cleaned air or gas around and/or through the inside of motor 2502 so that motor 2502 is cooled with clean air even in dusty environments.

Impeller 2506 may be positioned between modified clean-side cover 2504 and modified housing 2508. In some embodiments, impeller 2506 may be mounted onto the shaft of motor 2502 so that the impeller 2506 is driven by motor 2502.

Modified housing 2508 may combine the structures of inlet cover 108 and housing 104 as well as debris-discharge channel shown in FIG. 11 to provide the air intake and separation chamber for ACB 2500. In some embodiments, bolts or screws may be used to secure modified housing 2508 to modified clean-side cover 2504 and to the front or side of motor 2502. In some other embodiments, modified housing 2508 and modified clean-side cover 2504 could be combined by casting or in another way into a single structure.

Figure 26:
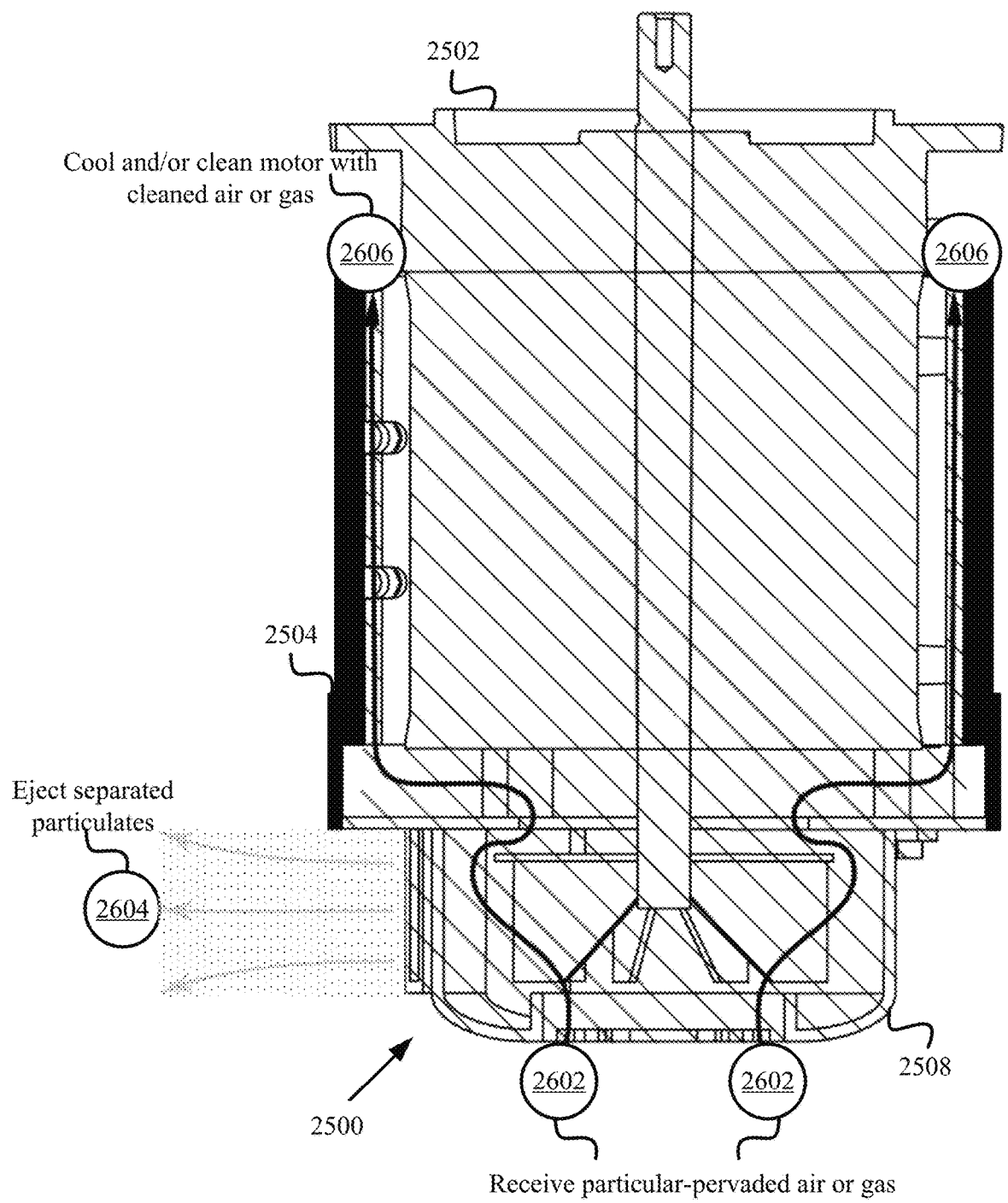
FIG. 26 illustrates cooling the outside of a host motor using the ACB it is powering to provide it with ventilating air or gas in accordance with some embodiments presented herein.

FIG. 26 illustrates cooling the outside of motor 2502 using ACB 2500 in accordance with some embodiments presented herein. As shown in FIG. 26, ACB 2500 receives (at 2602) particulate-pervaded air or gas from the surrounding environment, creates different pressure zones within modified housing 2508 to separate the particulates from the air or gas, ejects (at 2604) the debris and/or particulates out the side through the debris and/or particulate outlet, and passes (at 2606) the cleaned air or gas around motor 2502. Specifically, the extensions of modified clean-side cover 2504 surround motor 2502 and provide a gap into which the cleaned air or gas, that is not fed into motor 2502, may flow, thereby cooling motor 2502 and/or keeping motor 2502 clean.

Figure 27:
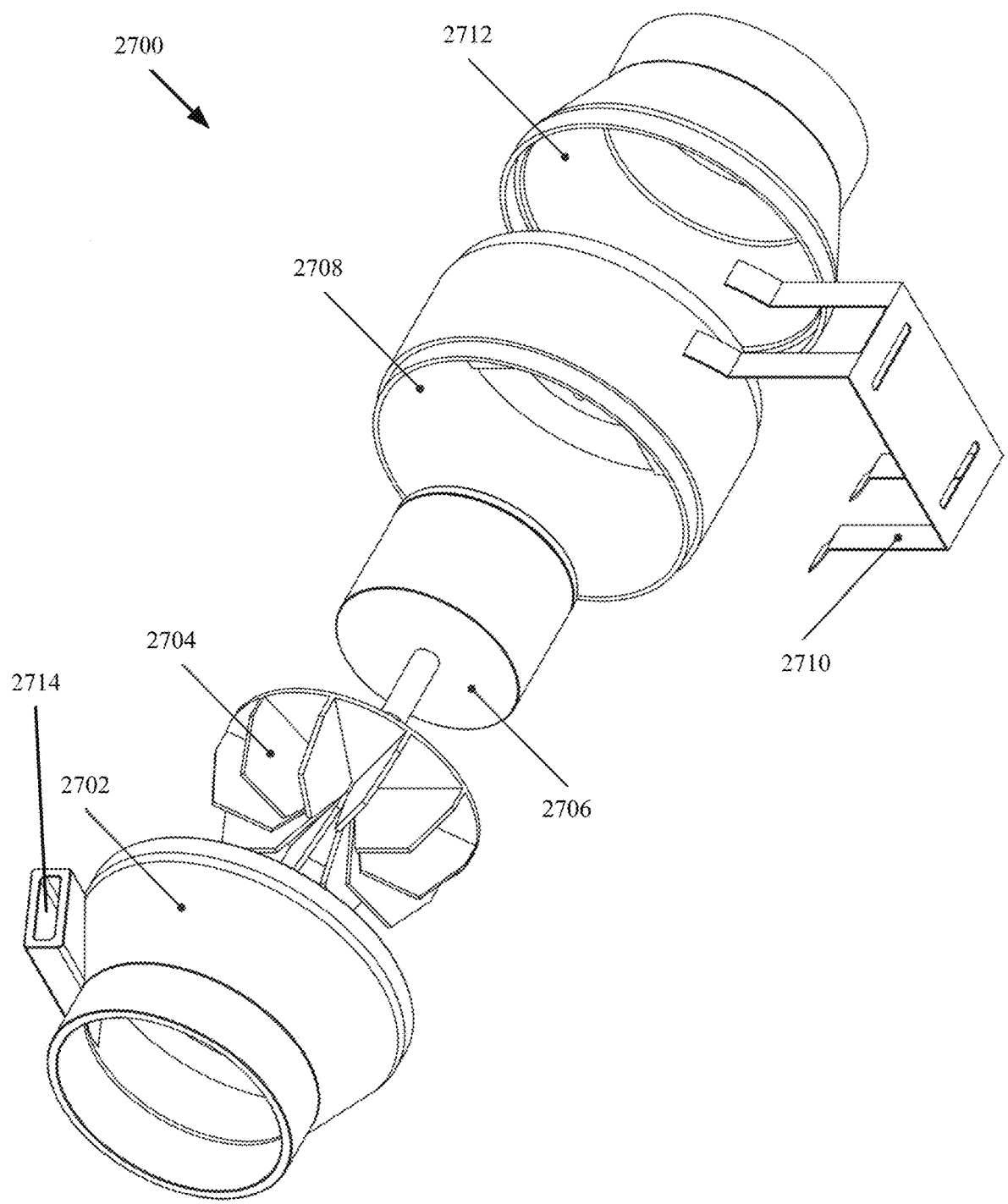
FIG. 27 illustrates example structures for integrating the ACB into or connecting it with ductwork in accordance with some embodiments presented herein.

In some embodiments, the structures of ACB 100 may be modified so that ACB 100 may be placed inside existing ductwork to clean, filter, and/or pressurize the air or gas passing inside the ductwork. FIG. 27 illustrates example structures for integrating ACB 2700 into or connecting ACB 2700 with ductwork in accordance with some embodiments presented herein. As shown in FIG. 27, ACB 2700 includes an integrated inlet cover and housing 2702, impeller 2704, motor 2706, clean-side cover 2708, optional mounting bracket 2710, and outlet 2712.

Inlet cover and housing 2702 may connect to one end of the ductwork, and outlet 2712 may connect to another end of the ductwork based on the desired direction of airflow through the ducting. Mounting bracket 2710 may be used to fix the position of ACB 2700 relative to the ducting and/or to connect ACB 2700 to a building's ceiling, wall, roof, or other structure.

Inlet cover and housing 2702 may receive the particulate-pervaded air or gas flowing within the ductwork. Motor 2706 may power rotation of impeller 2704 which creates the centrifugal forces on the particulate-pervaded air or gas within inlet cover and housing 2702. The forces cause the particulates to separate from the air or gas, and to circulate about the interior wall of inlet cover and housing 2702 towards debris-discharge channel 2714 or the particular outlet where they are ejected out from ACB 2700. The remaining cleaned air or gas circulates behind and past impeller 2704 through clean-side cover 2708, if any, and outlet 2712 back into the ductwork.

Figure 28:
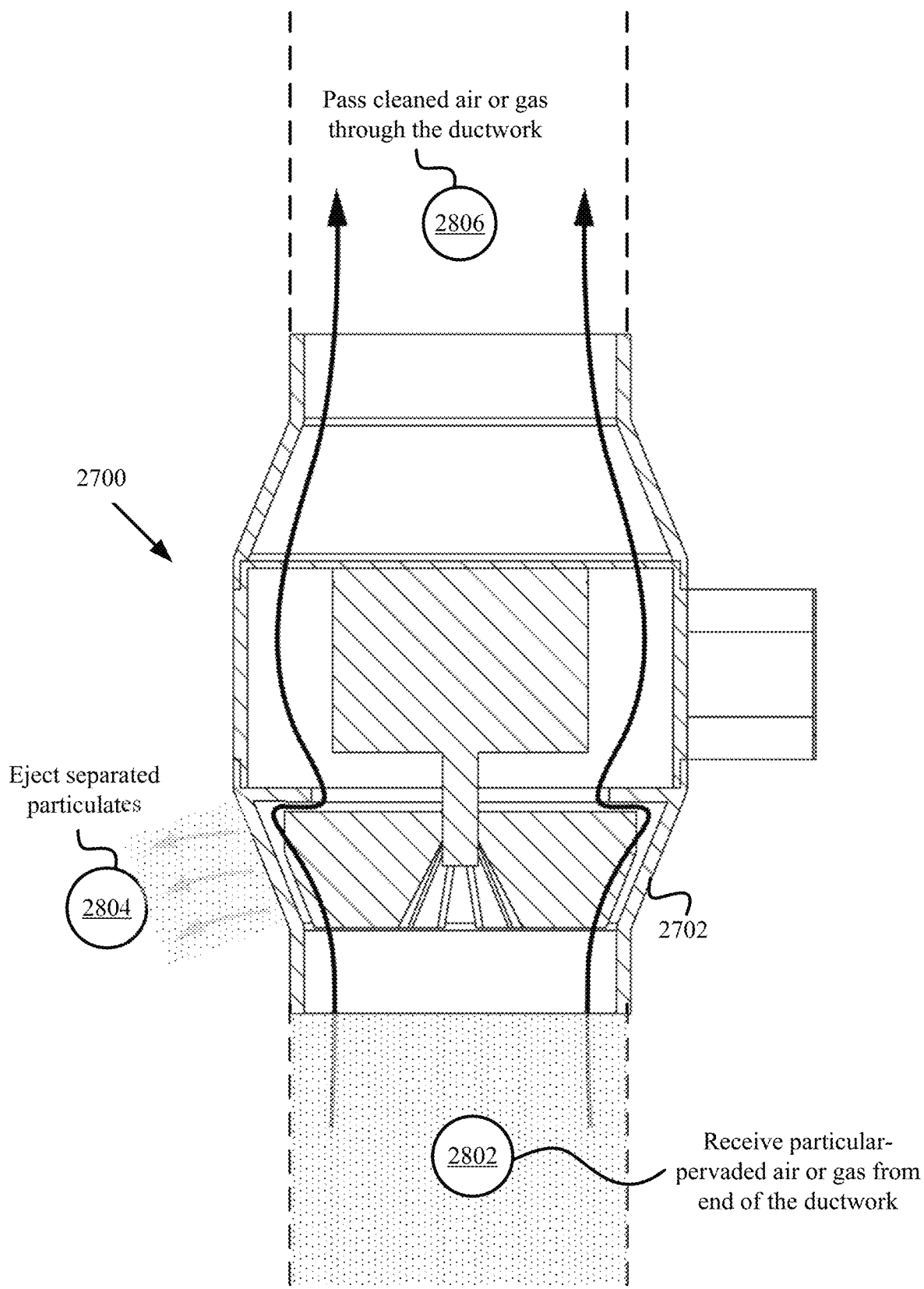
FIG. 28 illustrates operation of the ACB into or connecting it with ductwork in accordance with some embodiments presented herein.

FIG. 28 illustrates operation of ACB 2700 into or connecting it with ductwork in accordance with some embodiments presented herein. ACB 2700 receives (at 2802) particulate-pervaded air or gas flowing through ductwork at one end. ACB 2700 creates the different pressure zones within inlet cover and housing 2702 that separate the particulates from the air or gas, ejects (at 2804) the particulates out the side through the particular outlet, and passes (at 2806) the cleaned air or gas through to the other end of the ductwork.

In some embodiments, the motor powering operation of the impeller may be located away from the impeller. In some such embodiments, the motor may connect to the impeller via a pulley system and/or one or more gears. The pulley system and/or one or more gears may increase the rate at which the impeller rotates which may increase the filtration capacity or volume of the ACB. For instance, increasing the impeller speed may increase the total cubic feet per minute ("CFM") or the amount of airflow that is filtered by the ACB over a given interval of time.

Figure 29:
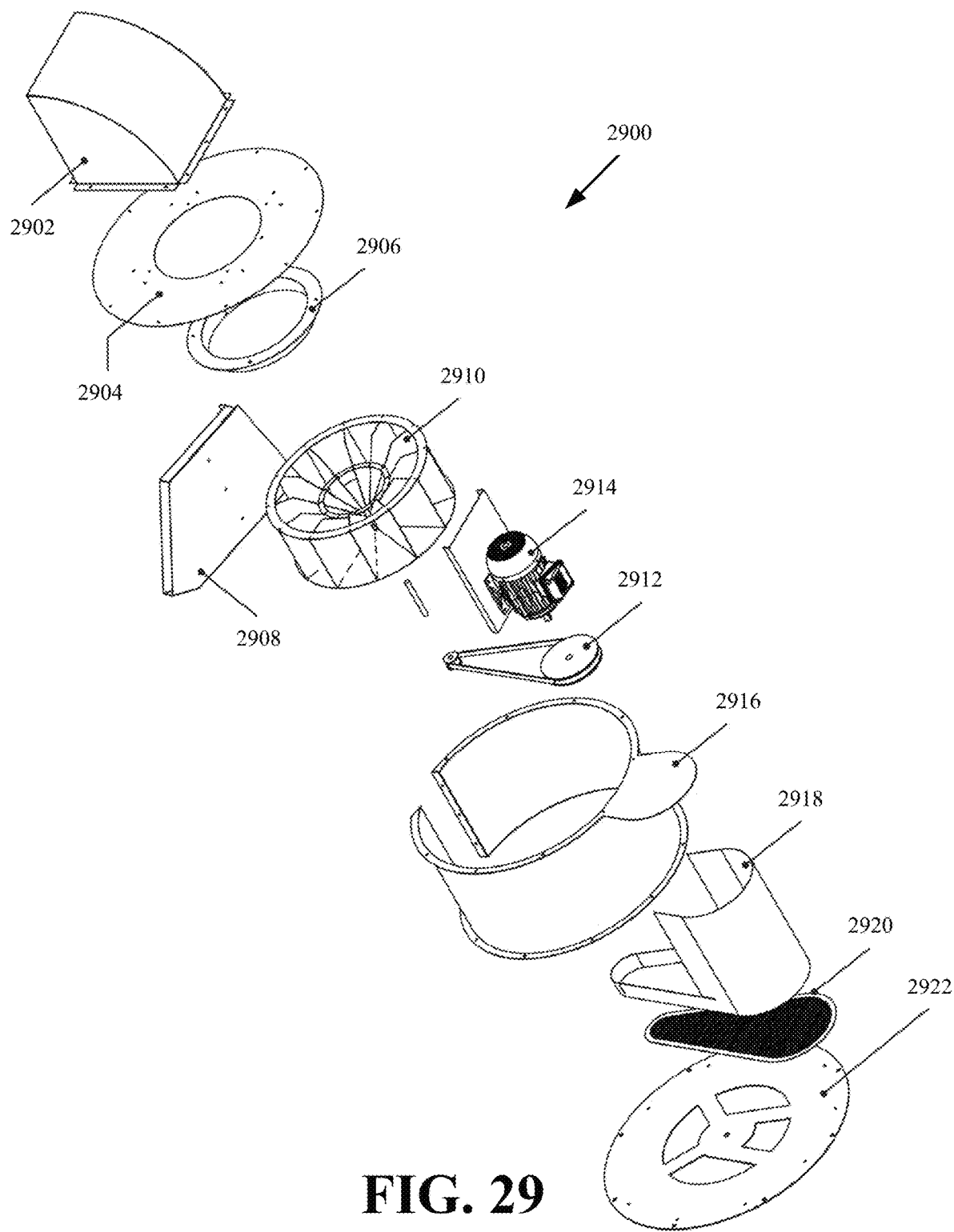
FIG. 29 illustrates an exploded view for the ACB with a pulley-driven impeller in accordance with some embodiments presented herein.

FIG. 29 illustrates an exploded view for ACB 2900 with a pulley-driven impeller in accordance with some embodiments presented herein. ACB 2900 may include inlet hood 2902, inlet cover 2904, inlet ring 2906, particulate chute 2908, impeller 2910, pulley system 2912, motor 2914, spinner ring or housing 2916, motor enclosure 2918, grill cover 2920, and clean-side cover 2922. Motor 2914 may be placed inside motor enclosure 2918 and protected by grill cover 2920. Motor enclosure 2918 may sit atop, below, or off to either side of housing 2916. Motor 2914 may be connected to impeller 2910 inside housing 2916 via pulley system 2912. Specifically, pulley system 2912 may be connected to drive shaft of motor 2914 on one end, and a shaft that connects to impeller 2910 on another end. In this configuration, ACB 2900 may be coupled with larger and more powerful motors 2914 or to motors in cooler or otherwise less harsh environments, such as outside of a chimney, to power impeller 2910 and the airflow, suction, and filtration of ACB 2900.

FIG. 30 illustrates modified structures for mounting an impeller/motor to increase airflow/CFM of clean gas/air in accordance with some embodiments presented herein. ACB 3000 may include modified motor/impeller mount 3002 which mounts the motor away from the clean side cover 3004, creating a gap of space between the two. This gap may allow for an increase of airflow/CFM and/or pressure.

Figure 31:
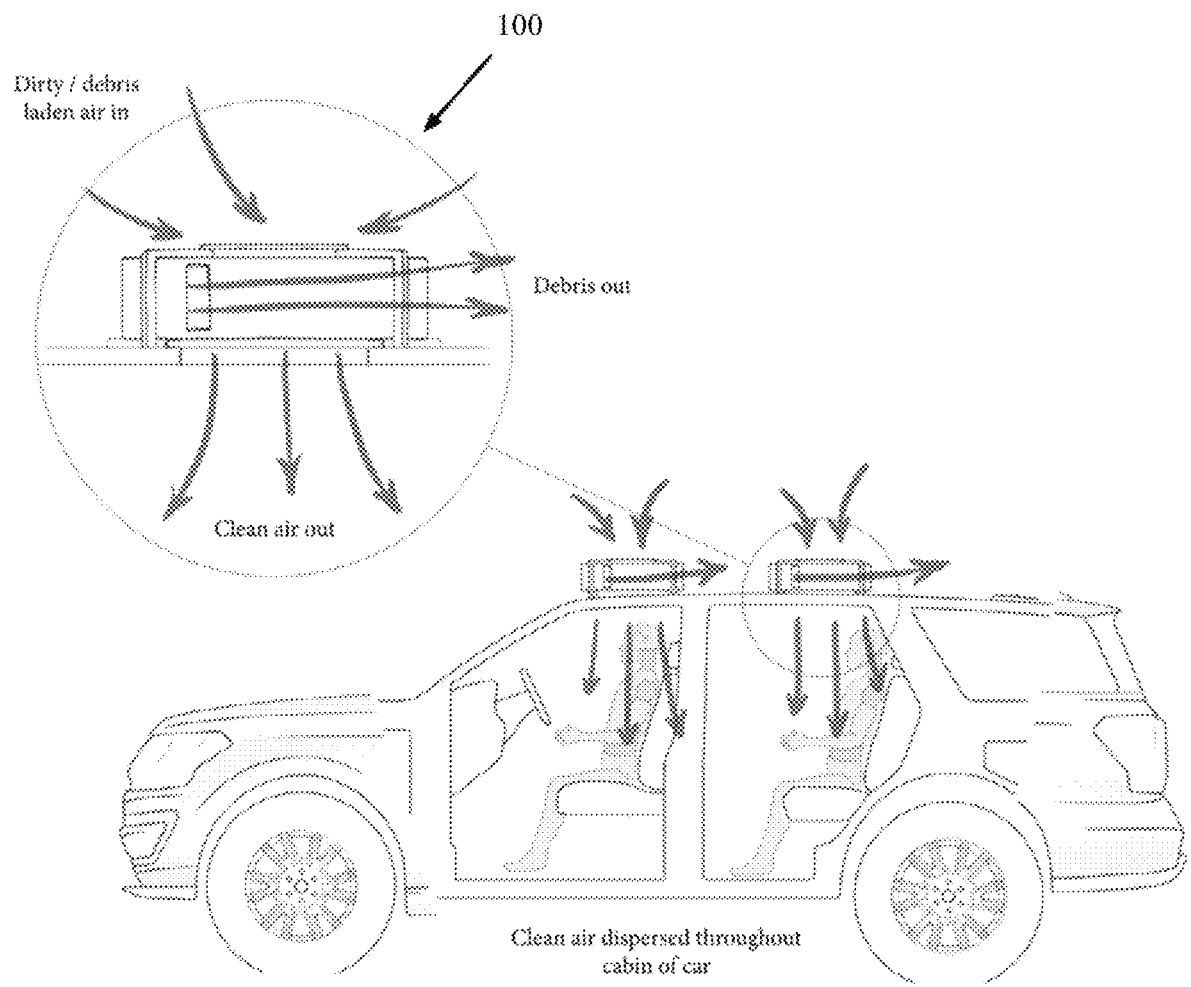
FIG. 31 illustrates an example of connecting the ACB to a car in accordance with some embodiments presented herein.
Figure 32:
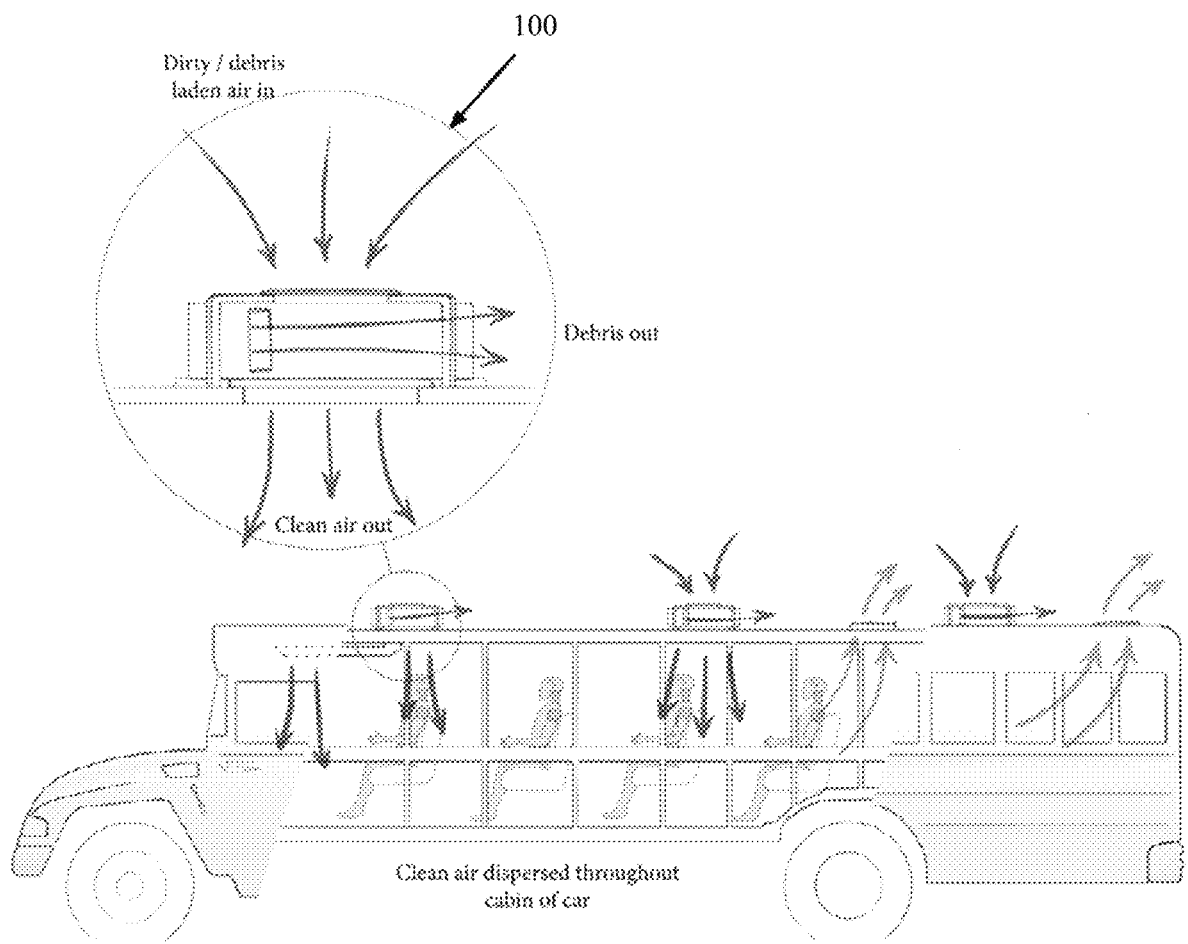
FIG. 32 illustrates an example of connecting the ACB to a bus in accordance with some embodiments presented herein.
Figure 33:
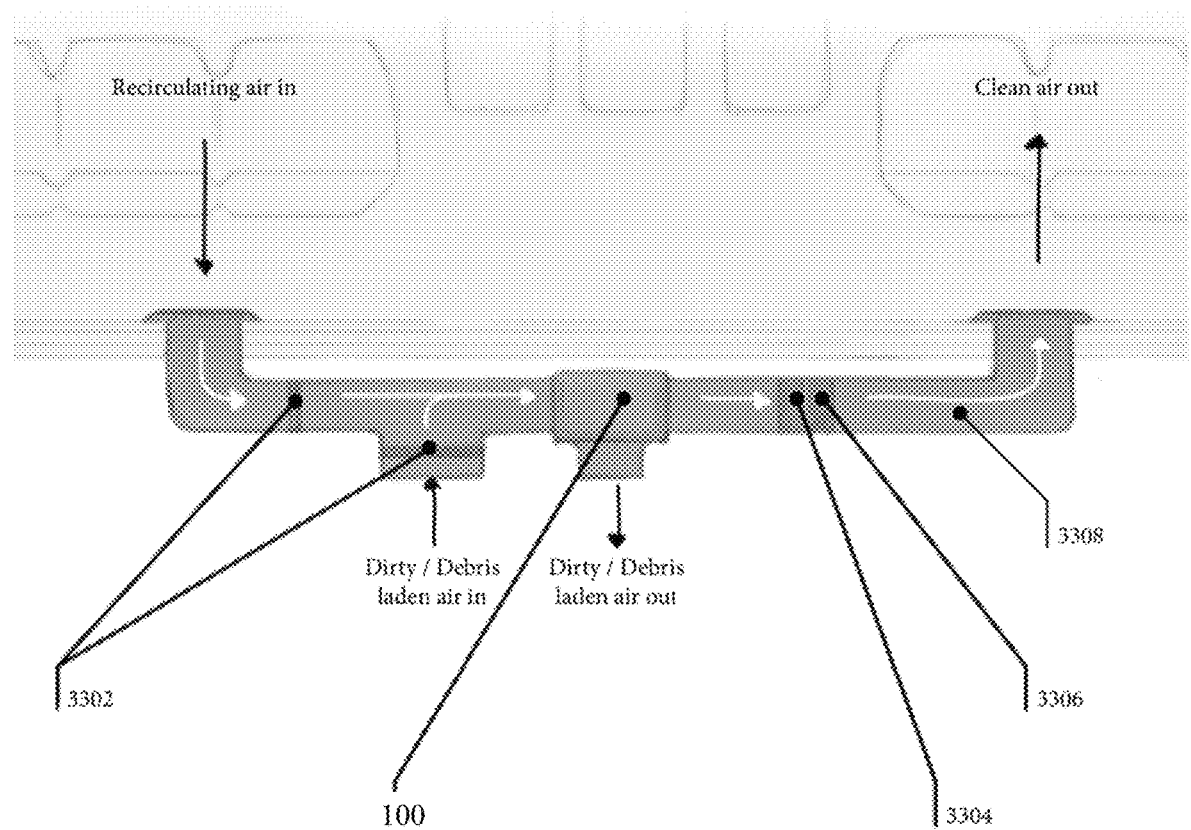
FIG. 33 illustrates an example of connecting the ACB to a train in accordance with some embodiments presented herein.

FIGS. 31, 32, and 33 illustrate example of connecting the ACB to a car, bus, and train car in accordance with some embodiments presented herein. As shown in FIGS. 31, 32, and 33, ACB 100 may be used to feed clean air for ventilation and pressurization of the cabin of cars, tanks, emergency vehicles, public transportation vehicles etc., and for keeping dust and debris out of the cabin. In some configurations, ACB 100 may be mounted on the side, top, or underneath the vehicle, as well as between the engine and the cabin.

In some embodiments, when ACB 100 is mounted to a vehicle it may be accompanied by various other heating, ventilation, and air conditioning ("HVAC") equipment/machines as a part of an entire HVAC system. As shown in FIG. 33, ACB 100 may be accompanied by flow dampeners 3302, air conditioner unit 3304, and heating element 3306, all of which may be connected by ducting 3308.

Figure 34:
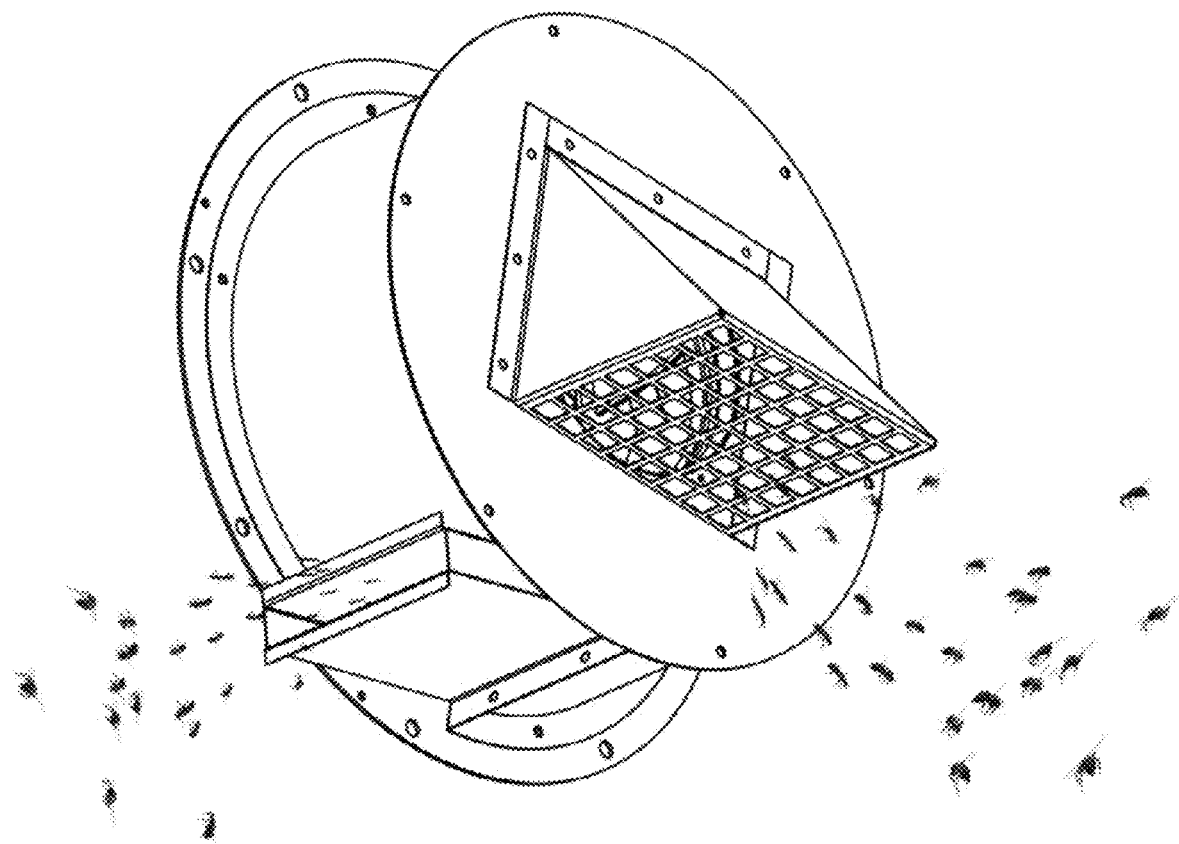
FIG. 34 illustrates using the ACB to supply clean air in an environment with insects or other undesired fauna in accordance with some embodiments presented herein.

FIG. 34 illustrates using ACB 100 to supply clean air in an environment with insects or other undesired fauna in accordance with some embodiments presented herein. As shown in FIG. 34, may receive the air from the outside environment, and may separate and eject the insects or other undesired fauna from the air before passing the cleaned air through to ducting, over a desired target, and/or into a desired location or enclosure.

Figure 35:
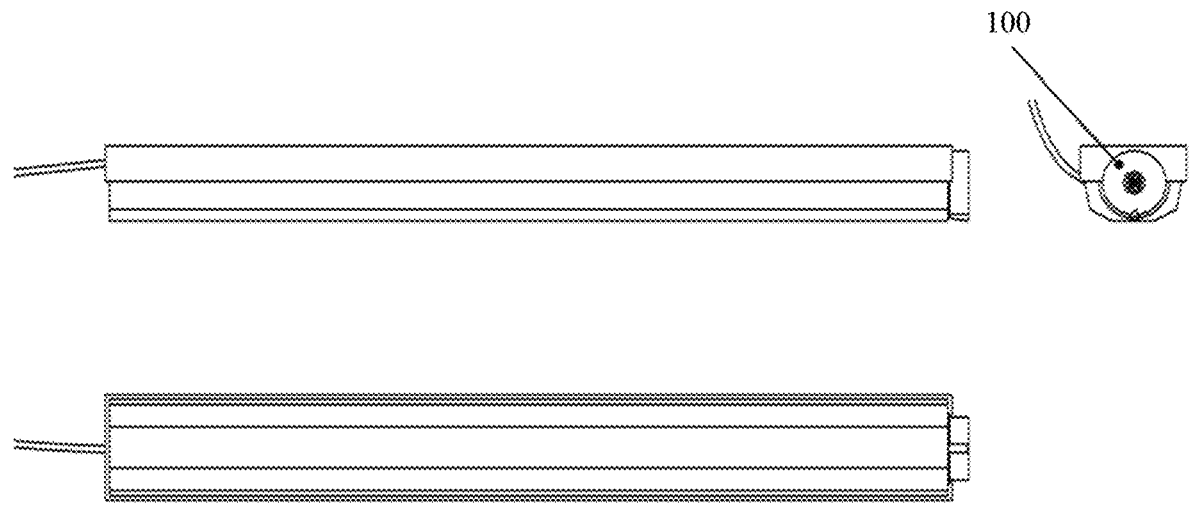
FIG. 35 illustrates an example of connecting the ACB to the end of a lighting fixture in accordance with some embodiments presented herein.
Figure 36:
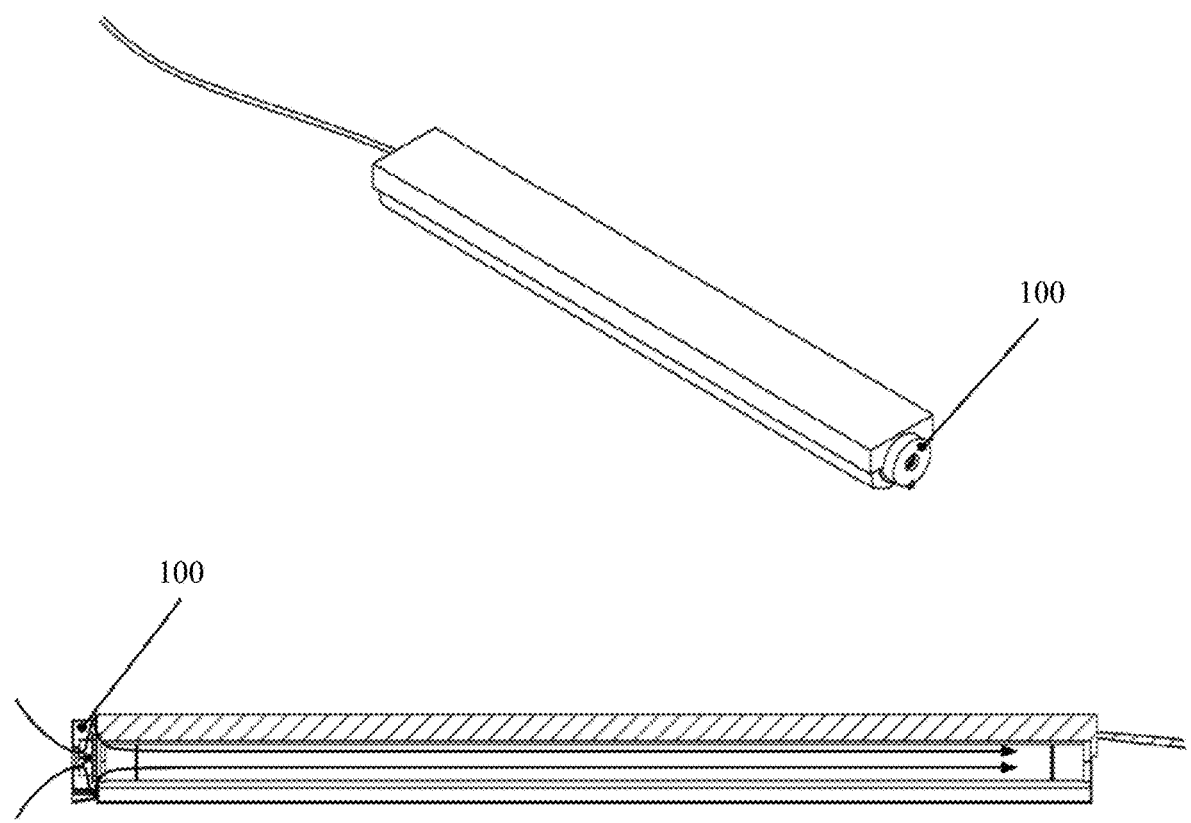
FIG. 36 illustrates a section view of the ACB connected to the end of a lighting fixture in accordance with some embodiments presented herein.

FIGS. 35 and 36 illustrate the use of ACB 100 to keep lighting fixtures clean and free of debris by passing clean air around and/or through the fixtures in accordance with some embodiments presented herein. Consequently, the debris cannot collect on or inside the housings or on the bulbs or lighting elements.

Figure 37:
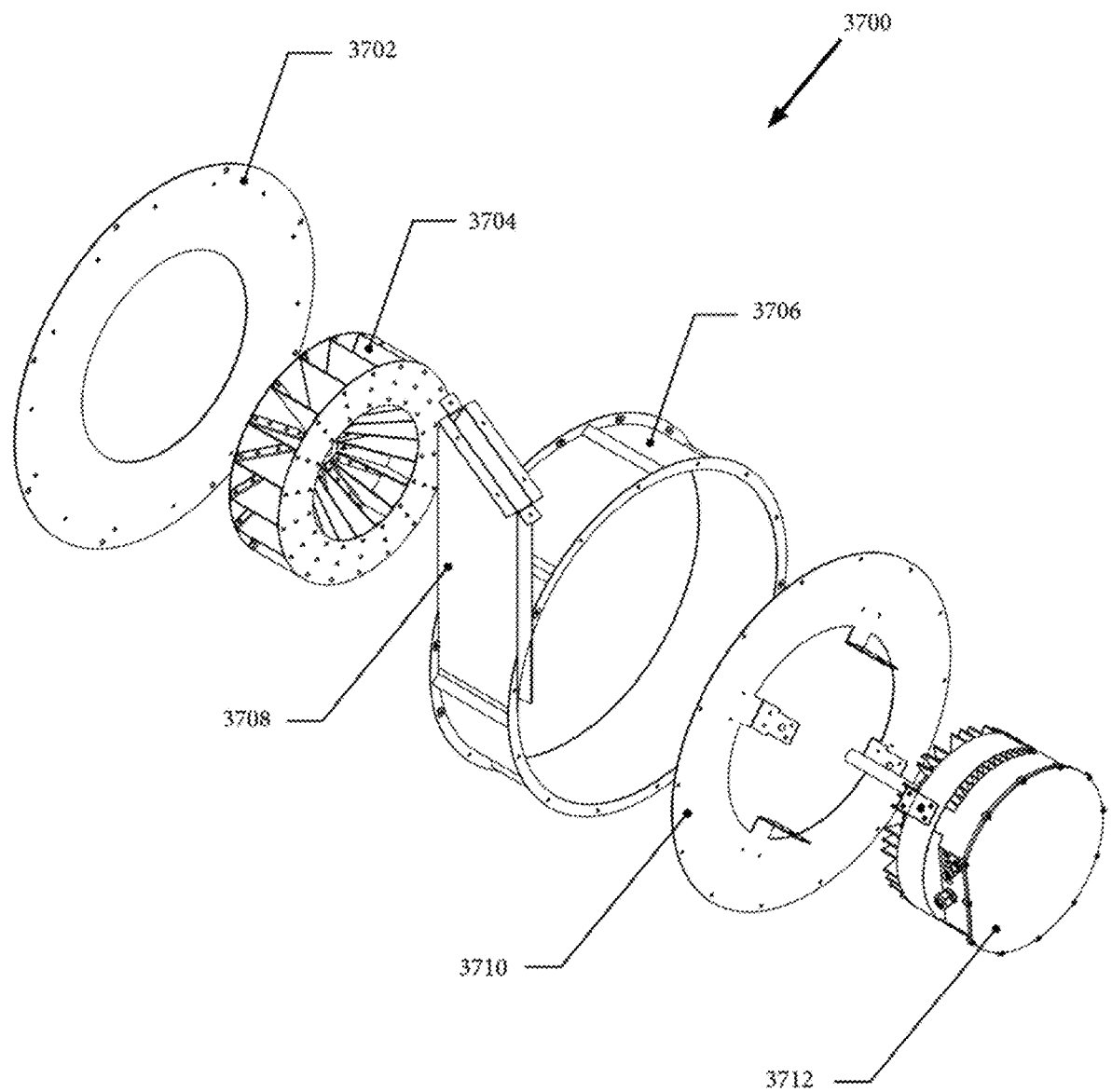
FIG. 37 illustrates an exploded view for the ACB with the motor mounted in front of the inlet cover in accordance with some embodiments presented herein.

FIG. 37 illustrates an exploded view of ACB 3700 with the motor mounted in front of inlet cover 3710 in accordance with some embodiments presented herein. ACB 3700 may include clean side cover 3702, impeller 3704, housing/spinner ring 3706, debris-discharge channel 3708, inlet cover 3710, and motor 3712. In some configurations, motor 3712 may be mounted in front of inlet cover 3710, behind clean side cover 3702, as well as atop, below, or off to either side of housing/spinner ring 3706, and/or may be connected to impeller 3704 via a belt, pulley, or gear system.

Figure 38:
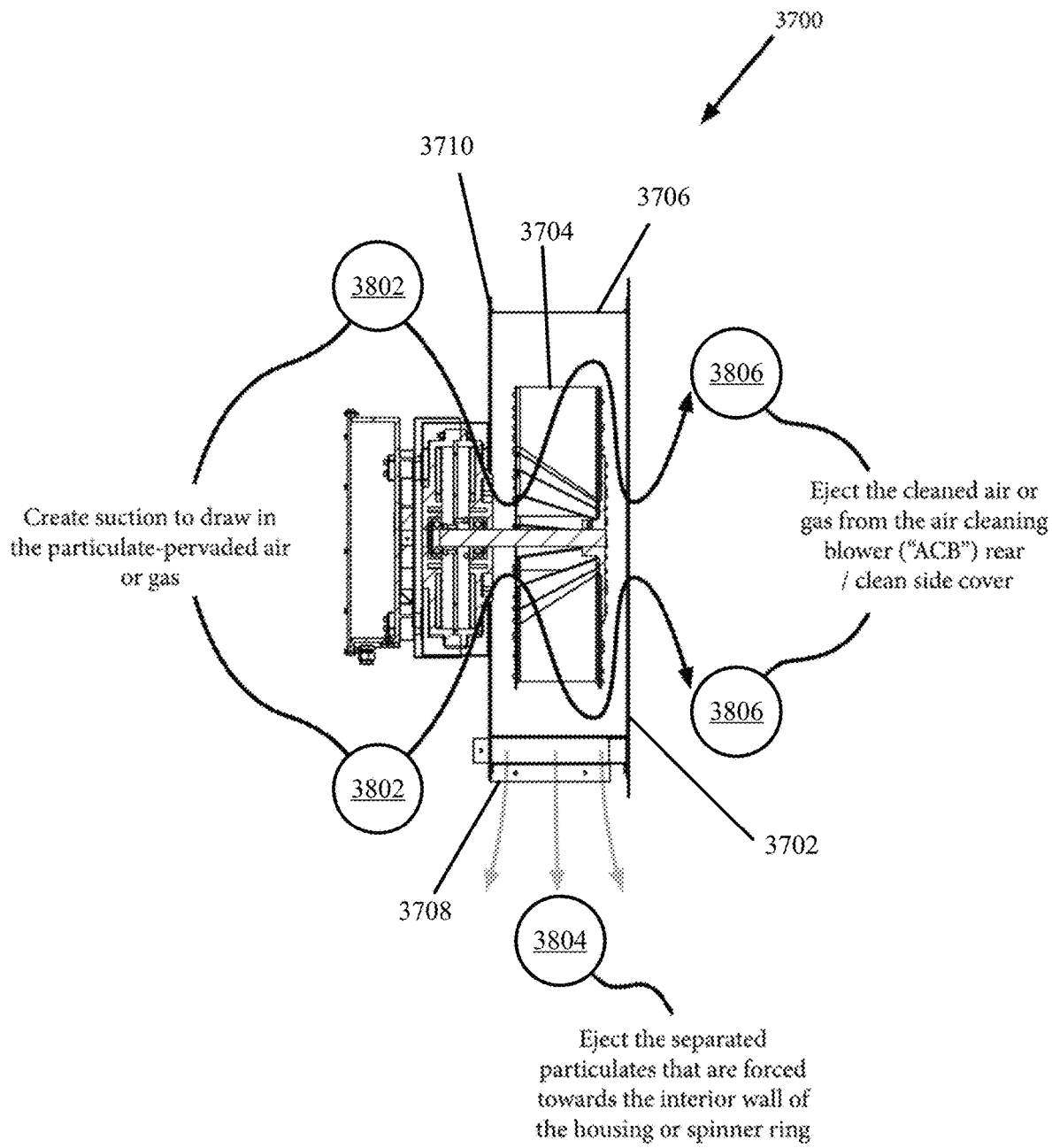
FIG. 38 illustrates example operation of the ACB separating particulates from air or gas in accordance with some embodiments presented herein.

FIG. 38 illustrates example operation of ACB 3700 separating particulates from air or gas in accordance with some embodiments presented herein. As shown in FIG. 38, rotation of impeller 3704 creates (at 3802) suction that draws in particulate-pervaded air or gas through central opening of inlet cover 3710, with or without an inlet ring.

The separated particulates may circulate about the inside of the exterior wall of housing 3706 until the particulates reach and are ejected (at 3804) out from particulate outlet 3708 about the side of ACB 3700. The cleaned air or gas may circulate closer to impeller 3704 and away from the interior side of the exterior walls of housing 3706 until reaching and exiting (at 3806) out the cleaned air or gas outlet provided by the central opening(s) in the clean side cover 3702.

What is claimed is:

1. An air-cleaning or gas-cleaning apparatus comprising:
   an inlet cover comprising a rigid flat surface with a central opening;
   a housing in a form of an incomplete cylinder comprising a hollow inner cavity and walls that extend circularly around the hollow inner cavity to a particular height between an inlet end and a discharge end and that are separated by a slit that creates a gap of the particular height between a first end and an opposite second end of the walls, wherein the inlet end of the housing comprises a first lip or flange that extends perpendicularly over the walls and away from the hollow inner cavity with the first lip or flange being directly connected to the inlet cover, and wherein the discharge end of the housing comprises a second lip or flange that extends perpendicularly from the walls and perpendicularly to or inclining away from the hollow inner cavity;
   a clean-side cover that is directly connected to the second lip or flange at the discharge end of the housing, the clean-side cover having a rigid flat surface with a plurality of apertures surrounding a center of the clean-side cover and with flat or inclined brackets extending between the plurality of apertures towards a center of the clean-side cover to form an impeller mount; and
   an impeller mounted to the impeller mount and disposed inside the housing between the inlet cover and the clean-side cover, wherein the impeller comprises a plurality of blades that rotate to induce suction of particulate-pervaded air or gas through the central opening, to circulate heavier particulates from the particulate-pervaded air or gas against an interior side of the walls until ejection through the slit, and to circulate lighter cleaned air or gas from the particulate-pervaded air or gas in front of the heavier particulates until ejection through the plurality of apertures.

2. The air-cleaning or gas-cleaning apparatus of claim 1, wherein the inlet cover is shaped or sized in proportion to a shape or size of the inlet end of the housing.

3. The air-cleaning or gas-cleaning apparatus of claim 1, wherein the first lip or flange comprises a flattened lip with a plurality of holes that align with a plurality of holes about the inlet cover, and wherein inlet cover is secured to the housing based on fasteners inserted through the plurality of holes of the flattened lip and the inlet cover.

4. The air-cleaning or gas-cleaning apparatus of claim 1, wherein the inlet cover is secured to the housing with welding, mechanical fastening, or an adhesive.

5. The air-cleaning or gas-cleaning apparatus of claim 1, wherein the slit extends up to an entire length between the inlet end and the discharge end of the housing and creates a discontinuity in the walls of the housing.

6. The air-cleaning or gas-cleaning apparatus of claim 1 further comprising:

a chute that extends inside the hollow inner cavity of the housing through the slit and that extends away from an exterior of the housing, wherein a width of the chute is equal to a width of the slit.

7. The air-cleaning or gas-cleaning apparatus of claim 1 further comprising:
a downspout that is connected to the slit, wherein the downspout comprises an inverted funnel enclosure that directs the heavier particulates out of the housing to a particular destination.

8. The air-cleaning or gas-cleaning apparatus of claim 1 further comprising:
an inlet cover that mounts over the central opening, wherein the inlet cover comprises a hood that extends over and covers a top side of the central opening, and wherein the hood comprises a screen to prevent other objects from entering inside through the central opening with the particulate-pervaded air or gas.

9. The air-cleaning or gas-cleaning apparatus of claim 1, wherein a screen is mounted about the inlet cover to be parallel, perpendicular, or angled relative to the central opening.

10. The air-cleaning or gas-cleaning apparatus of claim 1 further comprising:
a curtain or extension that is connected to a rear of the clean-side cover and that covers the plurality of apertures, wherein the curtain or extension redirects the cleaned air or gas over a particular target.

11. The air-cleaning or gas-cleaning apparatus of claim 1, wherein the clean-side cover comprises:
a cover that extends away from a backside of the clean-side cover, wherein the cover fits over a target object with a gap between the cover and the target object through which the cleaned air or gas flows to cool or protect the target object.

12. The air-cleaning or gas-cleaning apparatus of claim 1, wherein the inlet cover comprises a vertical extension that extends in front of the air-cleaning or gas-cleaning apparatus and that connects to a first duct; and
wherein the clean-side cover comprises a vertical extension that extends behind the air-cleaning or gas-cleaning apparatus and that connects to a second duct, wherein the vertical extension comprises one of a cylindrical surface or a conical surface.

13. The air-cleaning or gas-cleaning apparatus of claim 1, wherein the slit is positioned perpendicularly to the plurality of apertures.

14. The air-cleaning or gas-cleaning apparatus of claim 1, wherein the slit is configured to eject the heavier particulates about a side of the air-cleaning or gas-cleaning apparatus, and wherein the plurality of apertures are configured to eject the cleaned air or gas in a configurable direction from a rear of the air-cleaning or gas-cleaning apparatus.

15. The air-cleaning or gas-cleaning apparatus of claim 14, wherein the central opening is vertically aligned with the plurality of apertures, and wherein the central opening is separated from the plurality of apertures by the housing and the impeller.

16. The air-cleaning or gas-cleaning apparatus of claim 1, wherein rotation of the impeller generates a centrifugal force within the housing that forces the heavier particulates to accumulate about the interior of the walls of the housing and the lighter cleaned air or gas to deflect away from the heavier particulates to a region between the heavier particulates and the impeller.

17. The air-cleaning or gas-cleaning apparatus of claim 1 further comprising:
a motor positioned at a center of the impeller, wherein the motor powers rotation of the impeller.

18. The air-cleaning or gas-cleaning apparatus of claim 1 further comprising:
a motor located outside the housing; and
a connection between the motor and the impeller, wherein the connection comprises one of a rotating shaft or a pulley system.

19. The air-cleaning or gas-cleaning apparatus of claim 1, wherein each aperture of the plurality of apertures comprises a quarter-circular opening within the clean-side cover.

* * * * *